(12) United States Patent
Esch

(10) Patent No.: US 11,080,334 B1
(45) Date of Patent: Aug. 3, 2021

(54) GRAPH REPRESENTATION SYSTEM AND METHODS

(71) Applicant: Practical Posets LLC, Minneapolis, MN (US)

(72) Inventor: John W. Esch, Burnsville, MN (US)

(73) Assignee: PRACTICAL POSETS LLC, Minneapolis, MN (US)

( * ) Notice: Subject to any disclaimer, the term of this patent is extended or adjusted under 35 U.S.C. 154(b) by 0 days.

(21) Appl. No.: 17/110,829

(22) Filed: Dec. 3, 2020

(51) Int. Cl.
*G06F 16/901* (2019.01)

(52) U.S. Cl.
CPC .................. *G06F 16/9024* (2019.01)

(58) Field of Classification Search
None
See application file for complete search history.

(56) References Cited

U.S. PATENT DOCUMENTS

| | | | |
|---|---|---|---|
| 2007/0230488 A1* | 10/2007 | Yu ........................... | H04L 45/48 370/408 |
| 2017/0364534 A1* | 12/2017 | Zhang ...................... | G06N 5/04 |

OTHER PUBLICATIONS

Yildirim, Hilmi. "Scalable Reachability Indexing for very Large Graphs." Order No. 3514789 Rensselaer Polytechnic Institute, 2011. Ann Arbor: ProQuest. Retrieved Jan. 27, 2021 from https://dialog.proquest.com/professional/docview/1022175652?accountid=131444 (Year: 2011).*

Xue, Peng, et al. "A Reachability Query Approach with Path Interval Labeling." 2014 11th Web Information System and Application Conference (pp. 172-177). IEEE, 2014 (Year: 2014).*

Li, Fangxu, Pingpeng Yuan, and Hai Jin. "Interval-index: A scalable and fast approach for reachability queries in large graphs." International Conference on Knowledge Science, Engineering and Management (pp. 224-235). Springer, Cham, 2015. (Year: 2015).*

Yu, Jeffrey Xu, and Jiefeng Cheng. "Graph reachability queries: A survey." Managing and Mining Graph Data (pp. 181-215). Springer, Boston, MA, 2010. 181-215 (Year: 2010).*

* cited by examiner

*Primary Examiner* — Tony Mahmoudi
*Assistant Examiner* — Umar Mian
(74) *Attorney, Agent, or Firm* — Fredrikson & Byron, P.A.

(57) ABSTRACT

Methods can include receiving a graphbase comprising a first plurality of nodes and a plurality of edges representing covering-covered relationships between the nodes. Each node can comprise a plurality of node parameters such as a NodeNumber, a Reachable Interval, and an OwnTree Interval. For a traversal ordering of nodes, nodes comprised within the OwnTree Interval are reachable from the node, nodes comprised within the Reachable Interval may be reachable from the node, and nodes comprised within neither interval are not reachable by the node. Methods can additionally include the steps of receiving a first and second sub-set of nodes, the sub-sets being a sub-set of the first plurality of nodes. Furthermore, a relationship between the first and second sub-set can be determined using the NodeNumber, the OwnTree Interval, and the Reachable Interval.

17 Claims, 21 Drawing Sheets

| Reachable Interval | | OwnTree Interval | |
|---|---|---|---|
| Earliest Reachable | Latest Reachable | Node Number | Tree Extent |
| 1 | 1 | 1 | 9 |
| 2 | 2 | 2 | 8 |
| 3 | 3 | 3 | 5 |
| 4 | 4 | 4 | 4 |
| 5 | 5 | 5 | 5 |
| 6 | 6 | 6 | 8 |
| 7 | 7 | 7 | 7 |
| 8 | 8 | 8 | 8 |
| 9 | 9 | 9 | 9 |
| 2 | 9 | 10 | 10 |
| 3 | 8 | 11 | 13 |
| 3 | 8 | 12 | 12 |
| 13 | 13 | 13 | 13 |
| 3 | 13 | 14 | 14 |
| 3 | 13 | 15 | 15 |
| 3 | 8 | 16 | 18 |
| 3 | 8 | 17 | 17 |
| 18 | 18 | 18 | 18 |

| Reachable Interval | | OwnTree Interval | |
|---|---|---|---|
| Earliest Reachable | Latest Reachable | Node Number | Tree Extent |
| 3 | 18 | 19 | 19 |
| 4 | 5 | 20 | 23 |
| 4 | 5 | 21 | 22 |
| 4 | 5 | 22 | 22 |
| 23 | 23 | 23 | 23 |
| 4 | 22 | 24 | 26 |
| 4 | 22 | 25 | 25 |
| 26 | 26 | 26 | 26 |
| 4 | 26 | 27 | 27 |
| 4 | 22 | 28 | 30 |
| 4 | 22 | 29 | 29 |
| 30 | 30 | 30 | 30 |
| 7 | 8 | 31 | 34 |
| 7 | 8 | 32 | 33 |
| 7 | 8 | 33 | 33 |
| 34 | 34 | 34 | 34 |
| 7 | 34 | 35 | 35 |

| Search Needed | Graph Size | Approximate Time (µs) |
|---|---|---|
| No Search Needed | All Sizes | 7 |
| Search Needed | Smaller Graphs | 2.7*log(n)    n < 5 |
| Search Needed | Larger Graphs | 11*(log(n) -3)    n = 5 or 6 |

| | 850 | | | 870 | |
|---|---|---|---|---|---|
| 851 | Graph Code Word | | 871 | Node State Word | |
| 852 | Graph State Word | | 872 | Node Value | |
| 853 | Graph Index | | 873 | Node Number | |
| 854 | Graph Size | | 874 | My Graph Number | |
| 855 | Number of Nodes | | 875 | Num Covering Nodes | |
| 856 | Number of Edges | | 876 | Num Covered Nodes | |
| 857 | Number of Subgraphs | | 877 | Tree Extent | |
| 858 | Node Location List | | 878 | Earliest Reachable | |
| 859 | Subgraph Location List | | 879 | Latest Reachable | |
| 860 | node 0 | | 880 | Covering Nodes List | |
| 870 | nodes | | 881 | Covered Nodes List | |

Each Graph Data ⬈        Each Node Data ⬈

FIG. 8B

GRAPH REPRESENTATION SYSTEM AND METHODS

BACKGROUND

Graphbases can be associated with various types of data. For example graphbases can be used to store and/or organize data for further use by applications and users. When being used by users and applications there is a need to quickly and efficiently search through graphbases. However, particularly with large graphbases, previous structures and methods do not always provide effective enough searches. Thus, there is a need to provide systems and methods to allow for more effective graphbase searches.

SUMMARY

Embodiments described herein generally relate to systems and methods for determining a relationship between a plurality of nodes comprised within a graphbase. The graphbase may comprise one or more directed acyclic graphs (DAGs). Each of the one or more DAGs may include a main set of nodes and a plurality of directional edges. Each of the plurality of nodes may represent a data point within the DAG and additionally be traversally ordered. The plurality of edges may represent connections and/or relationships between the plurality of nodes. In some embodiments, each of the plurality of edges may represent a covering-covered relationship between two nodes.

Each of the plurality of nodes may also comprise one or more node parameters. The node parameters may include a NodeNumber, a NodeValue, a TreeExtent, a LatestReachable, and an EarliestReachable. The NodeNumber may be representative of the location of the node within the DAG. The NodeValue may be representative of a unique identify of the node. The TreeExtent may be representative of the largest NodeNumber within an OwnTree Interval for the node. The LatestReachable may be representative of the largest NodeNumber within a Reachable Interval for the node. The EarliestReachable may be representative of the smallest NodeNumber within the Reachable Interval for the node.

In some embodiments additional node parameters may be defined, such as the OwnTree Interval and the Reachable Interval. The Own Tree Interval of a traversal ordering may be the interval between the NodeNumber and the TreeExtent wherein nodes comprised within the OwnTree Interval are reachable from the node. The Reachable Interval of a traversal ordering may be the interval between the EarliestReachable and the LatestReachable and nodes comprised within the Reachable Interval may be reachable from the node. In some instances, any nodes not comprised within the Reachable Interval and/or OwnTree Interval are not reachable from the node.

Systems and methods may additionally comprise the steps of receiving a selection of a first sub-set of nodes and a second sub-set of nodes. The first sub-set of nodes and second sub-set of nodes are a sub-set of the main set of nodes comprised within the same DAG of the graphbase. Exemplary sub-sets may comprise a single node, a grouping of nodes, or the like. Additionally, systems and methods may comprise the step of determining a relationship between the first sub-set of nodes and the second sub-set of nodes. The relationship may be determined based on one or more node parameters, such as the NodeNumber, the OwnTree Interval, and the Reachable Interval. Exemplary relationships may comprise determining if a first node is connected to a second node, a minimal join for a plurality of nodes, and a maximal meet for a plurality of nodes.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use with the explanations in the following detailed description. Embodiments of the invention will hereinafter be described in conjunction with the appended drawings, wherein like numerals denote like elements.

FIG. 5A provides a table illustrating each node and the respective node parameters for the DAG of FIGS. 2A-2D.

FIG. 7 provides execution time results.

FIGS. 8A and 8B provide an exemplary storage system comprising various sub-arrays to store elements of a graphbase.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Those skilled in the art will recognize that many of the noted examples have a variety of suitable alternatives.

Figure 1:
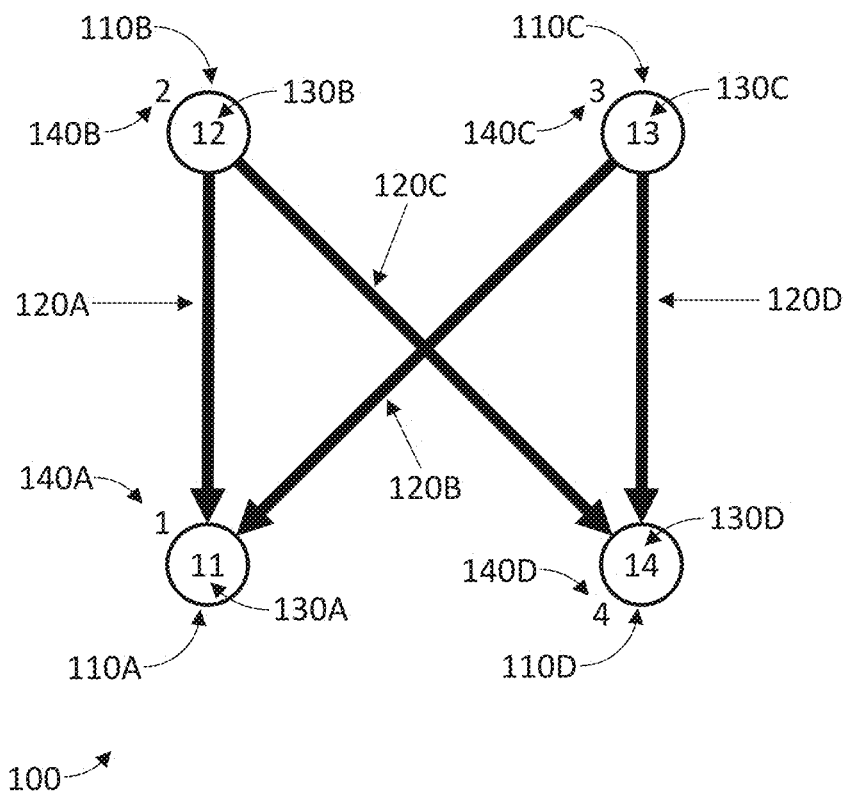
FIG. 1 illustrates an exemplary directed acyclic graph.

Embodiments described herein generally relate to systems and methods of editing, organizing, and viewing graphbases. Graphbases generally comprise one or more graphs which in turn comprise one or more nodes. In some embodiments each graph is a directed acyclic graph (DAG) which can comprise one or more nodes and one or more directional edges connecting the nodes. FIG. 1 provides an exemplary illustration of DAG 100 which comprises four nodes 110A-D and four edges 120A-D connecting the nodes. Each of nodes 110A-D may comprise a variety of parameters, such as a NodeValue (e.g. NodeValues 130A-D) and a NodeNumber (e.g. NodeNumbers 140A-D).

NodeValues (e.g. NodeValues 130A-D) can be used to uniquely identify a node. As shown, node 110A comprises a NodeValue of 11, node 110B comprises a NodeValue of 12, node 110C comprises a NodeValue of 13, and node 110D comprises a NodeValue of 14. In some embodiments, NodeValues may be numbers in a sequential order comprising numbers within the range of 1 to the number of nodes. Alternatively, NodeValues may comprise NodeValues which are numbers not in a sequential order and/or comprise other characters, such as letters, symbols, special characters, or the like. In some embodiments, the NodeValues can be chosen by a user or an external application. In such embodiments, the NodeValues may have external uses determined by a user or by an external application. Furthermore, NodeValues may not change when the DAG is edited, as discussed herein.

NodeNumbers (e.g. NodeNumbers 140A-D) can be references based on the location of the given node within the DAG. NodeNumbers can serve one or more purposes, such as providing an efficient means of accessing a given node's data and/or establishing a traversal ordering of the nodes. For example, NodeNumbers can be used in DAGs comprising a linear ordering of the nodes. A linear ordering of nodes may comprise nodes ordered such that for every directed edge UV from node U to covered node V, node U's NodeNumber is less than that of node V's NodeNumber if in an ordered traversal of all nodes and edges of the DAG, node U is encountered first, and is greater than that of node V's NodeNumber if it is encountered after node V is encountered. Similar to NodeValues, each NodeNumber in a DAG can be unique. In some embodiments, each NodeNumber comprised within a DAG is unique. Unlike NodeValues, which can be provided by a user and/or external application, NodeNumbers can be generated. In some embodiments, NodeNumbers range from 1 to the number of nodes. Other embodiment may use other representations and techniques to identify and access nodes, such as NodeNumbers comprising letters, special characters, symbols, or the like. In such embodiments, the NodeNumbers may still reflect a traversal ordering and allow for the comparison of NodeNumbers. In some embodiments, NodeNumbers are adjusted when the DAG is edited, as discussed herein. FIG. 1 provides an exemplary embodiment wherein nodes (e.g. nodes 110A-D) are labeled in a sequential traversal order. As shown, node 110A comprises NodeNumber 1, node 110B comprises NodeNumber 2, node 110C comprises NodeNumber 3, and node 110D comprises NodeNumber 4.

Edges, such as edges 120A-D in DAG 100, may represent links between nodes within a graph, such as representing parent-child node relationships as shown with directional edges 120A-D in FIG. 1. In some embodiments described herein, the node at the tail of the edge is called the covering node and the node at the head of the edge is called the covered node. For each node, covering nodes may represent other nodes that it covers (e.g. a parent node covers one or more child nodes), and covered nodes may represent other nodes covered by it (e.g. a child node is covered by one or more parent nodes). For example, in DAG 100 node 110A is connected to node 110B via edge 120A, node 110A is connected to node 110C via edge 120B, node 110B is connected to node 110D via edge 120C, and node 110D is connected to node 110C via edge 120D. Thus, nodes 110B and 110C (parent nodes) both cover (child) nodes 110A and 110D and both (child) nodes 110A and 110D are covered by (parent) nodes 110B and 110C. In some embodiments, each node may further comprise information regarding the number of covering nodes and covered nodes as well as which nodes are being covered and which nodes are covering nodes.

To provide a more concise explanation, NodeNumbers herein may be referred to as just nodes; for example, a node with NodeNumber 1 may be referred to as node 1 and a node with NodeNumber "n" may be referred to as node n.

Figure 2A:
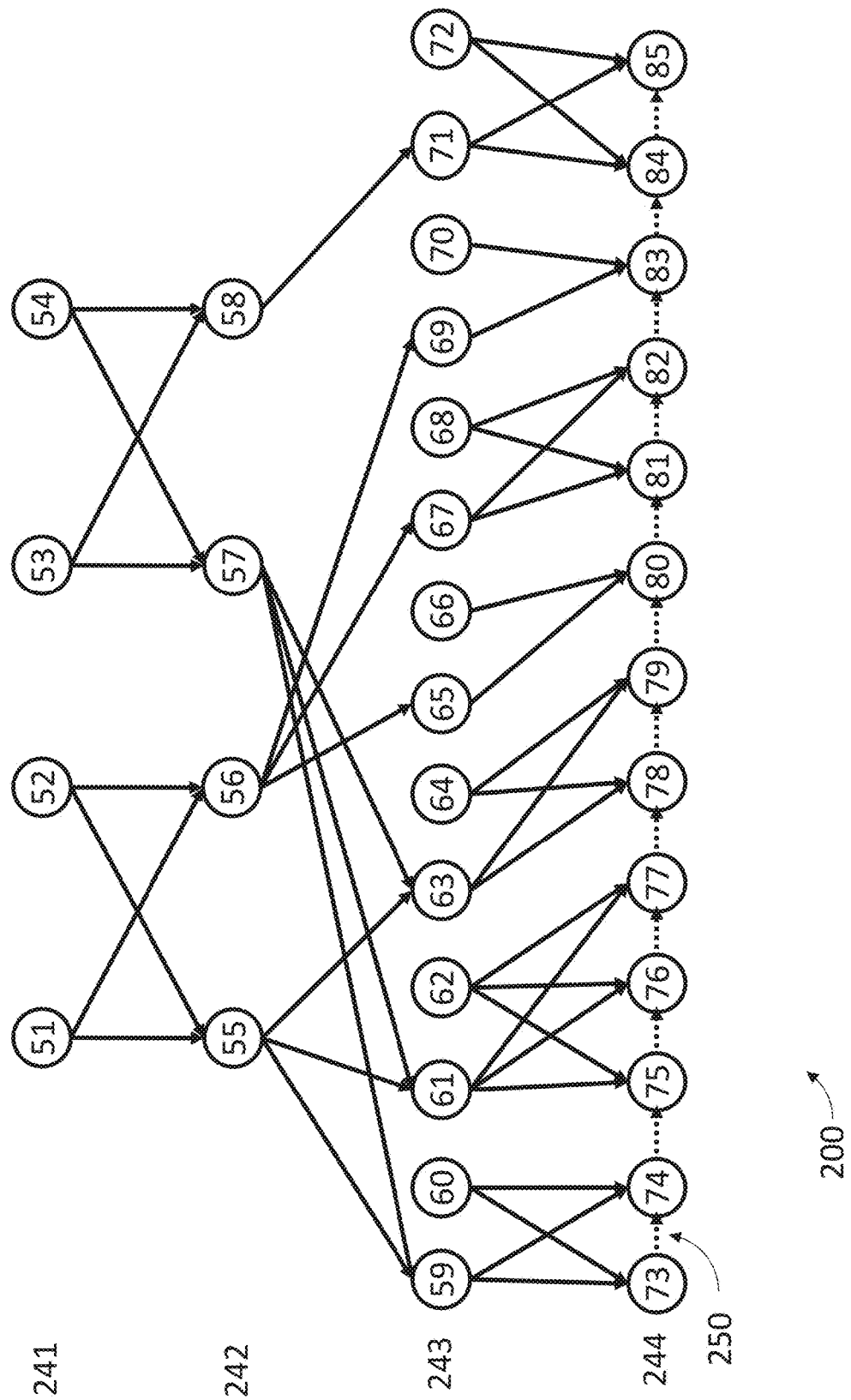
FIGS. 2A-2D illustrate an additional directed acyclic graph.

FIG. 2A provides another exemplary DAG, DAG 200, comprising nodes and edges similar to those comprised within DAG 100 and described herein. With respect to DAG 200, each node comprises a NodeValue, however the nodes do not yet comprise a NodeNumber. The example shown in FIG. 2A may be analogous to a new graph (e.g. a graph just received from a user or an external application) which has not been populated with additional node parameters, such as NodeNumbers. In some embodiments, a user or external application provides a set of covering and covered NodeValues that are to be connected by an edge. The received program keeps track of (e.g. continually adjusts) the current set of roots (covered nodes that do not cover any other nodes) and set of leaves (covering nodes that do not have any covering nodes). In some embodiments, a root is a node that does not cover any other nodes. In some embodiments, the ordering of the roots can be completely arbitrary. Alternatively, the order of roots may be done using methods known to one of ordinary skill in the art, such as being provided by the user and/or external application. The dashed arrows 250 shown in FIGS. 2B-2D indicate the order chosen in the exemplary embodiment. In some embodiments, the order is retained throughout the life of the graph, such as to maintain traversal ordering.

Figure 2B:
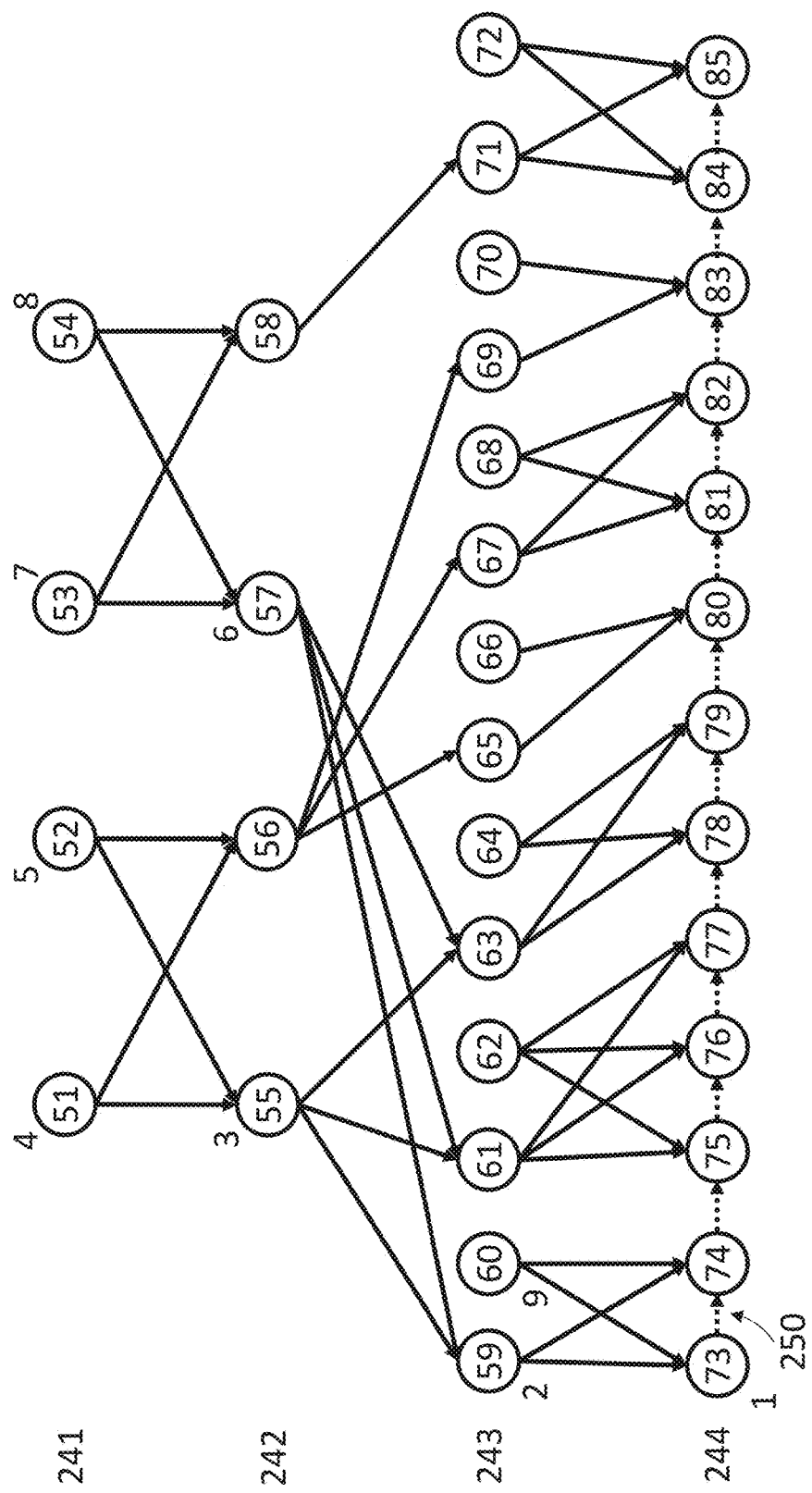

FIG. 2B provides an example of how a graph (e.g. DAG 200) can be populated with NodeNumbers. As shown, a first root node may be chosen (e.g. based on the ordering shown by dashed arrows 250) and can be deemed node 1. In this example, the leftmost node (e.g. the node with NodeValue 73) in row 241 is the first node populated as node 1 (e.g. the node comprising NodeNumber 1). The initially chosen root node may be chosen using any method known to one of ordinary skill in the art, such as based on the order received. After the initial node 1 is chosen, an edge is followed up through the covering nodes (e.g. generations to continue the ancestry analogy) to populate NodeNumbers for each node visited. As shown in FIG. 2B, edges are followed from node 1 to the node with NodeValue 59 which is given the next available NodeNumber, node 2. Edges may be continually followed resulting in the labelling of node 3 (e.g. the node with NodeValue 55) and node 4 (e.g. the node with NodeValue 51). Once node 4 is reached, a leaf-most node is reached so there are no more edges to follow. From here, the system may backtrack to node 3 and follow any additional edges, such as the edge up to the node with NodeValue 52 and label it as node 5. Again, since there are no leaf-ward edges to follow the system may backtrack to node 3, to node 2, and then proceed to follow an edge to the node with NodeValue 57 and proceed to label it as node 6. The method may continue and label the node with NodeValue 53 as node 7, the node with NodeValue 54 as node 8, and the node with NodeValue 60 as node 9. Each node's covering edges can be followed in any order. In some embodiments the edges are followed based on the order received; however, the order chosen should be remembered and used to order the list of covering nodes so that the traversal ordering can be maintained.

As shown in FIG. 2B, each node reachable from root node 1 (e.g. nodes 2-9) have been reached and provide a NodeNumber. In turn, nodes 2-9 may be considered nodes comprised within node 1's OwnTree. A node's OwnTree may comprise any leaf-ward nodes not yet previously visited when populating nodes. For example, nodes 2-9 were not previously visited, so node 1's OwnTree comprises nodes 2-9. Similarly, node 2's OwnTree would be 3-9, node 3's OwnTree would be 4-5, etc. In some embodiments, the farthest-reaching node within a node's OwnTree (e.g. the node comprising the largest NodeNumber) may be labeled as the node's TreeExtent. Furthermore, a node's parameters may comprise the node's TreeExtent.

Figure 2C:
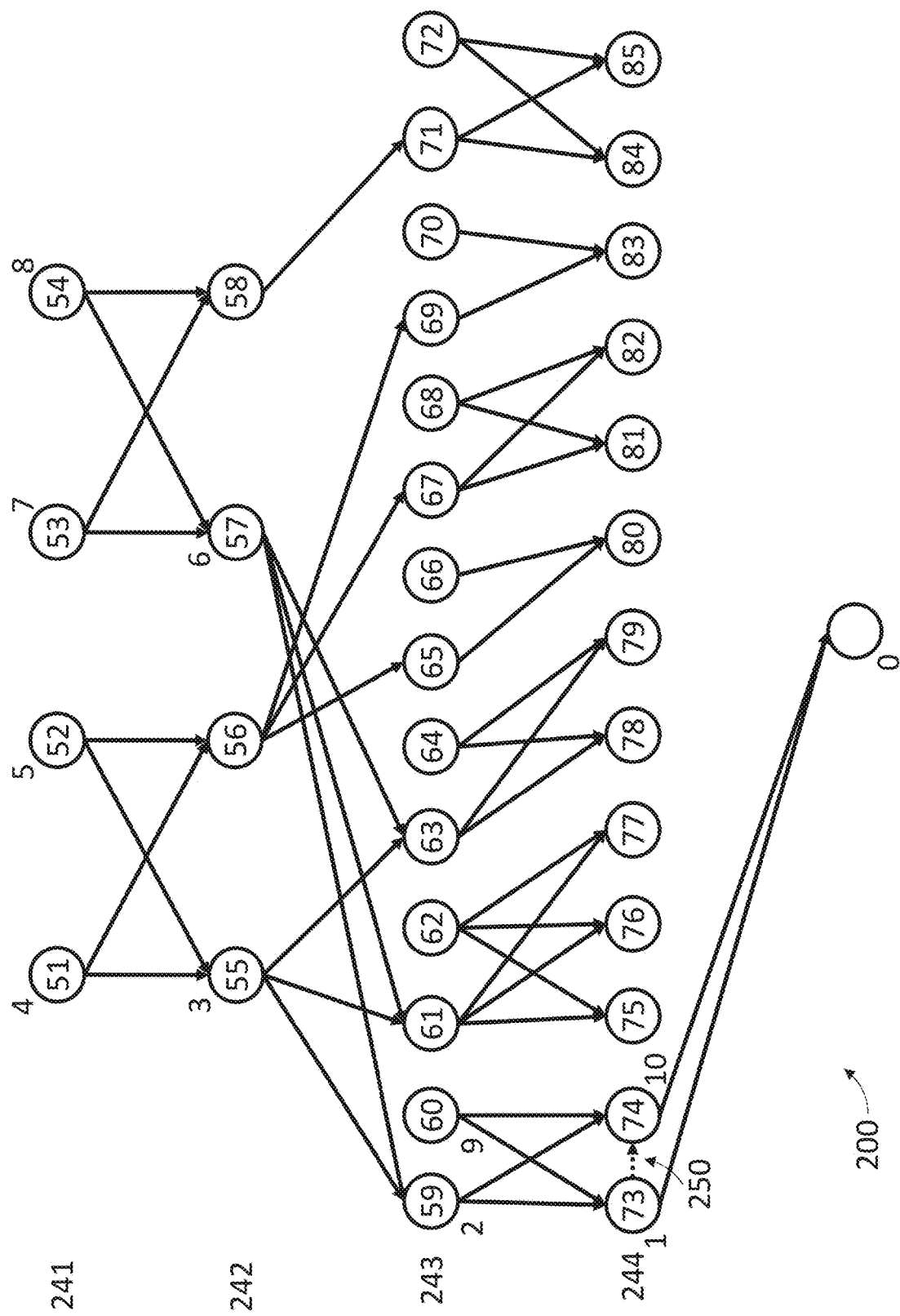

FIG. 2C illustrates an embodiment wherein the next root node is chosen and populated (e.g. node 10). As shown in FIG. 2C, node 10 is connected to nodes 2-9, however, nodes 2-9 are not necessarily comprised within node 10's OwnTree, since nodes 2-9 have previously been visited. However, nodes 2-9 may be comprised within node 10's Reachable Tree, since nodes 2-9 are reachable from node 10, but have been previously labeled. In some embodiments, the farthest-reaching node within a node's Reachable Tree (e.g. the node comprising the largest NodeNumber) may be labeled as the LatestReachable. Additionally, the earliest-reaching node within a node's Reachable Tree (e.g. the node comprising the earliest NodeNumber) may be labeled as the EarliestReachable. Furthermore, a node's parameters may comprise the LatestReachable and/or the EarliestReachable.

Additionally, root nodes may be linked together, such as shown with the dashed arrow 250 connecting nodes 1 and 10. In the exemplary embodiment shown in FIGS. 2C-2D, a node 0 may be used to identify the root nodes where node 0's covering nodes are the roots and node 0's covered nodes are the leaves (not shown in FIG. 2C). This allows the same methods to be used to provide access to the roots and leaves as described herein for other nodes.

Figure 2D:
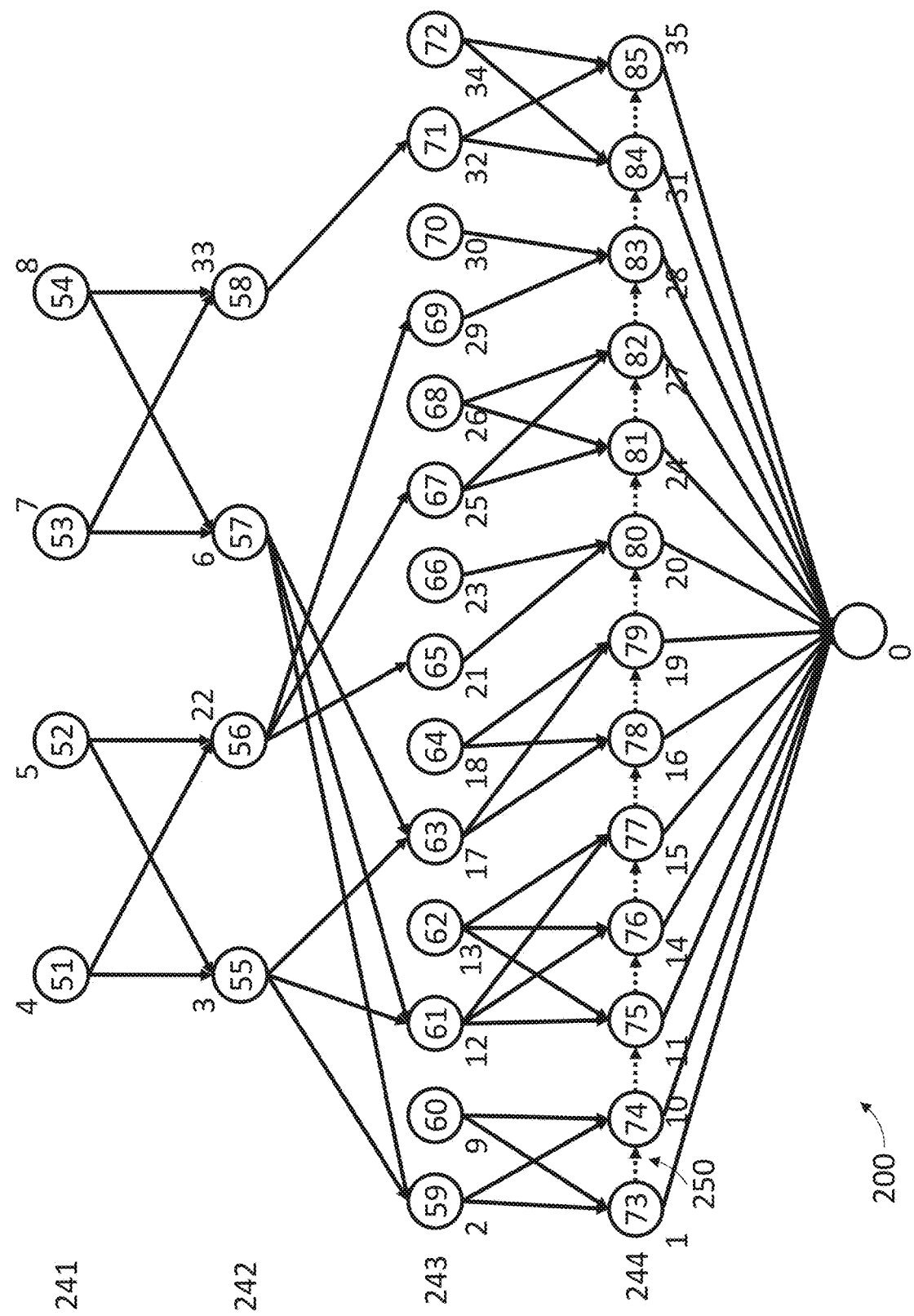

FIG. 2D provides further representation of DAG 200 wherein every node within DAG 200 has been populated with a NodeNumber. In some embodiments, NodeNumbers may be populated using the method described herein, wherein each root node may be accessed via a node 0.

Figure 3:
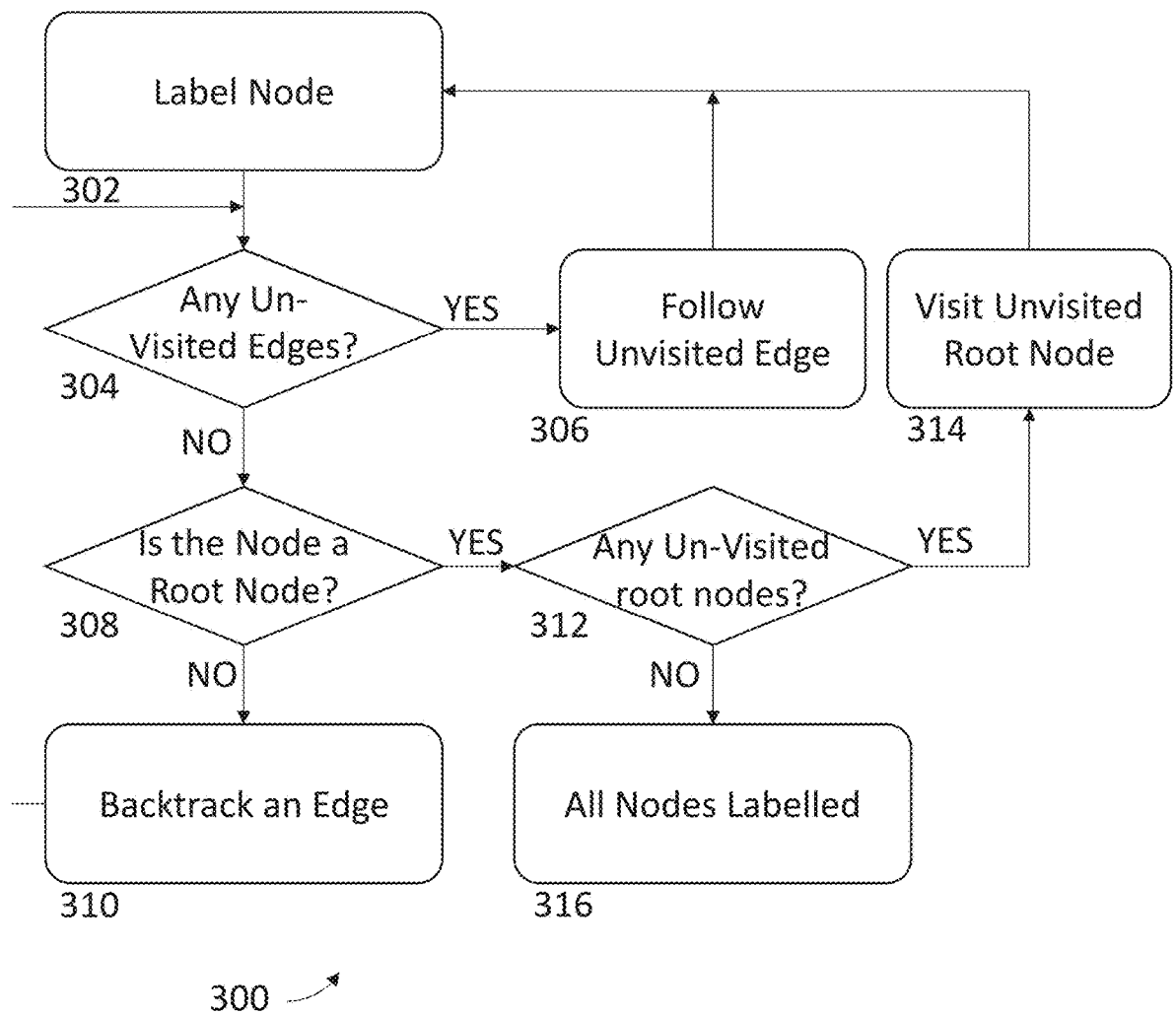
FIG. 3 illustrates an exemplary method of populating NodeNumbers

FIG. 3 illustrates an exemplary method 300 on how NodeNumbers may be populated, as described above with respect to FIGS. 2A-2D. Method 300 is a graph traversal/walking algorithm that determines a traversal ordering for a graph. As shown in FIG. 3, a node may be chosen and provides a NodeNumber (Step 302). As described herein, the NodeNumbers can be provided in a sequence, such as using the next available integer (e.g. 1, 2, 3, etc.) however other methods may be used, such as methods wherein the NodeNumbers chosen allows order comparison and the traversal ordering to be maintained. In some embodiments, the initially chosen node is a root node to obtain bottom-up ordering. However, in alternative embodiments a different node may be chosen, such as leaf node to obtain top-down ordering. Once the node is provided a NodeNumber, the next step is to determine if there are any edges which haven't been visited and/or followed (Yes in Step 304). If there are additional edges which haven't been visited, an edge can be followed to an unvisited node (Step 306) and the corresponding node may be provided a NodeNumber (Step 302). In some embodiments, the order of edges for a particular covered node can be the order that the edges were received as input and that order can be used to determine if there are edges for a node and the order its edges are processed/visited.

If there are no unvisited edges to follow (No in Step 304) then it may be determined whether or not the corresponding node is a root node (Step 308). If the corresponding node is not a root node (No in Step 308), then the system may backtrack an edge (Step 310) and again determine whether or not there are any unvisited/unfollowed edges (Step 304). Furthermore, if the edge is a root node (Yes in Step 308) than it may be determined whether or not there are any more unvisited root nodes (Step 312). If there are (Yes in Step 312), then an unvisited root node may be visited (Step 314) and labeled accordingly (Step 302). If there are no more unvisited root nodes (No in Step 312) then all nodes have been labeled (Step 316).

In addition to populating nodes, similar methods to method 300 can be used to provide nodes with additional parameters, such as TreeExtent, EarliestReachable, and LatestReachable. In some embodiments, each node has a list of immediately covering nodes. In such embodiments, there can be two kinds of nodes comprised within that list, path nodes that are in the starting nodes OwnTree and crossover nodes that have already been visited before and given a NodeNumber. In FIG. 3, a system performing method 300 may keep track of the last NodeNumber issued in Step 302; so, if it determines that there are no more unvisited edges (No in Step 304), it can set TreeExtent of the node to the current largest issued NodeNumber. The EarliestReachable can be computed in Step 310 by propagating crossover node's EarliestReachable back to the covered node and setting its EarliestReachable to the smaller of that value and its current value. Similarly, LatestReachable can be computed by (1) selecting a candidate value (e.g. NodeNumber) between a crossover node's TreeExtent or a path node's LatestReachable, and (2) propagating that candidate back to the covered node and setting its LatestReachable to the larger of the candidate and its current value. In some embodiments, the node parameters TreeExtent, EarliestReachable, and LatestReachable for leaf nodes may all comprise the same value as the NodeNumber.

Figure 4A:
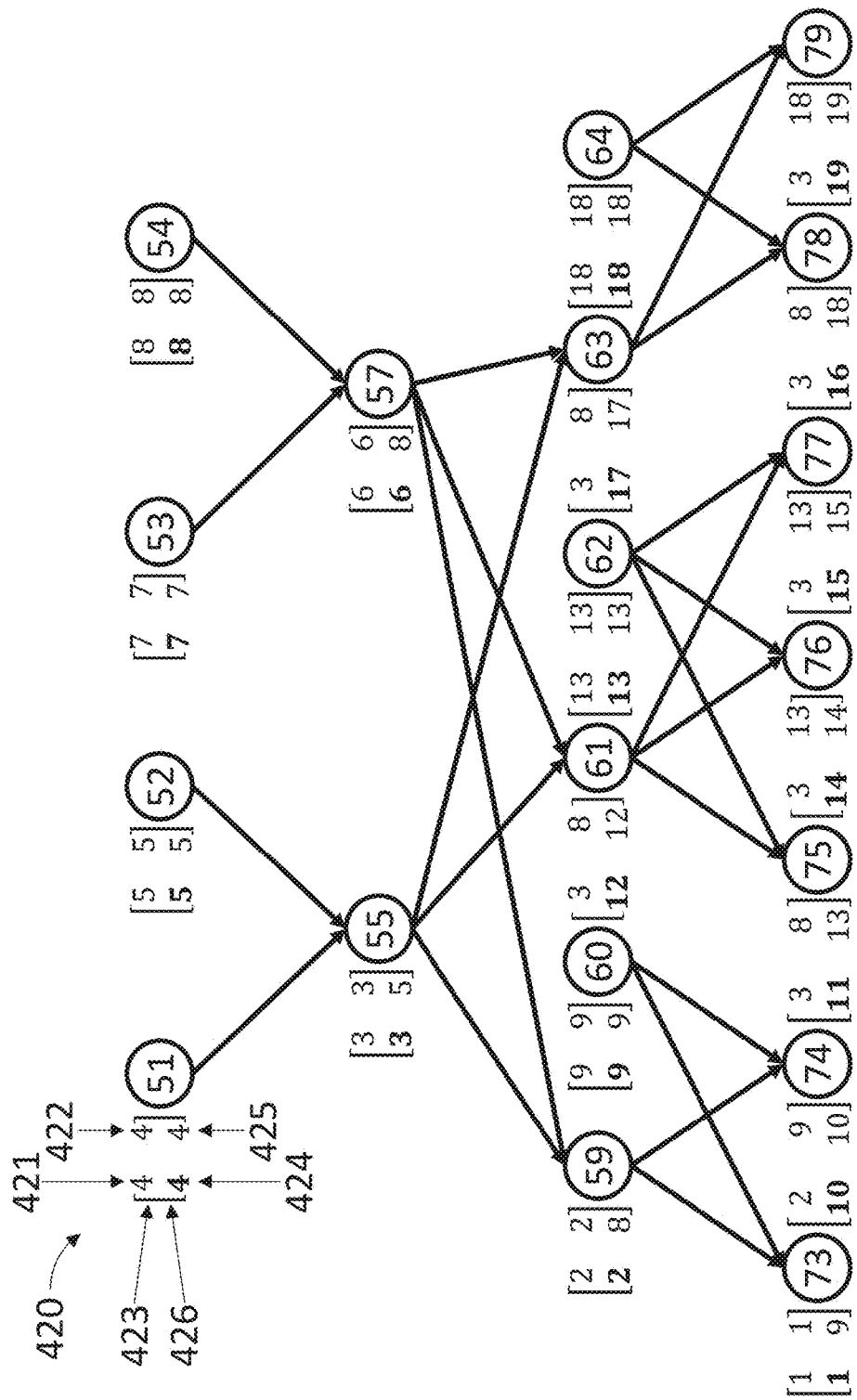
FIGS. 4A and 4B provide a more details illustration of the DAG of FIGS. 2A-2D.
Figure 4B:
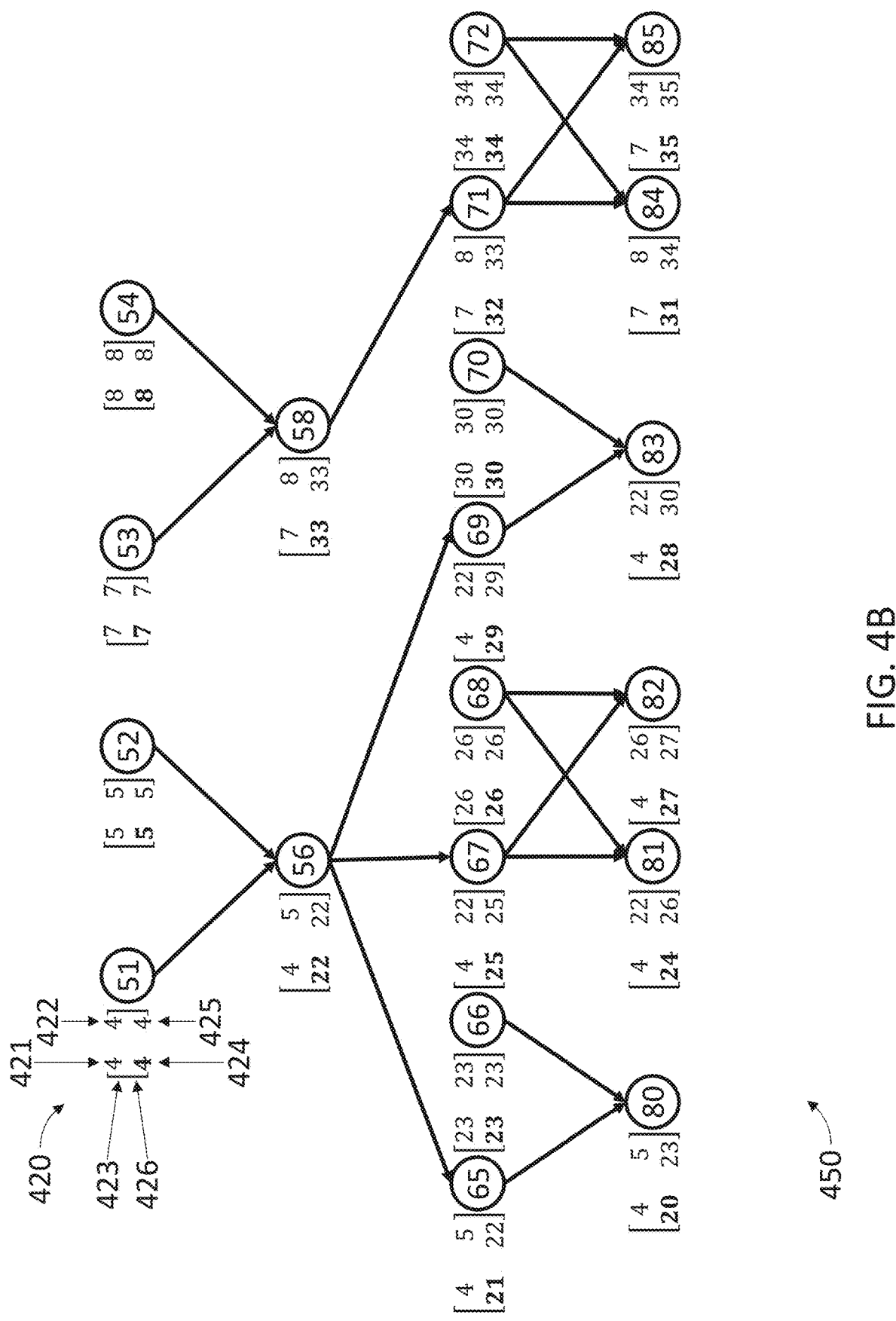

FIGS. 4A and 4B shows DAG 200 split into two halves. FIG. 4A illustrates graph 400 which is a first half of DAG 200 and FIG. 4B illustrates graph 450 which is a second half of DAG 200. Next to each node is a matrix 420 representing various node parameters associated with each node. As shown each node may comprise the parameters of EarliestReachable (node parameter 421) and latest reachable (node parameter 422). As discussed herein, the interval between the EarliestReachable and the LatestReachable may be Reachable Interval (node parameter 423). Furthermore, each node may comprise the parameters of the NodeNumber (node parameter 424) and the TreeExtent (node parameter 425). As discussed herein, the interval between the NodeNumber and the TreeExtent may be the OwnTree Interval (node parameter 426). In some embodiments, node parameters 423 and 426 may be stored for each node.

Alternatively, node parameters 423 and 426 may be derived from other parameters stored for each node, as described herein.

Utilizing Node Parameters

Figure 5B:
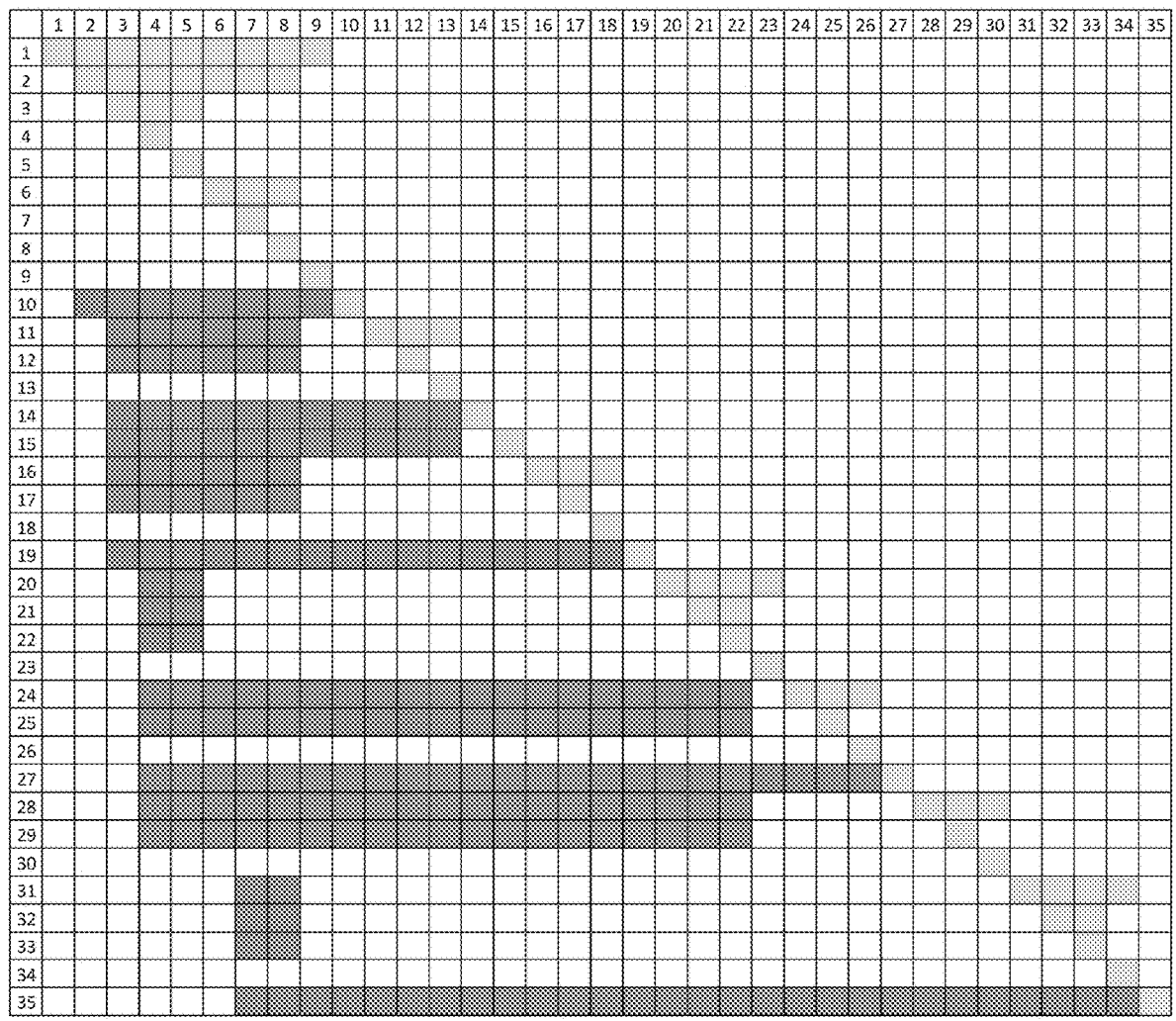
FIG. 5B provides a tabular representation of each node and the respective node parameters for the DAG of FIGS. 2A-2D.

FIG. 5A provides a table 500 comprising each node and the stored node parameters from FIGS. 4A and 4B for DAG 200 as shown in FIG. 2D. In some embodiments, each node parameter (e.g. TreeExtent, EarliestReachable, LatestReachable, etc.) may be populated along with the NodeNumbers. However, other embodiments may use other methods, such as populating various node parameters after the NodeNumbers have been populated. Additionally, table 550 in FIG. 5B provides a tabular representation of every node in DAG 200 with every node's OwnTree (light grey squares) and Reachable Tree (dark grey squares) labeled.

As can be seen in FIGS. 5A-5B, and in particular FIG. 5B, each node has a path to nodes between its own NodeNumber and its TreeExtent and possibly has a path to nodes between its EarliestReachable node and its LatestReachable node (the Reachable Interval). That is, all nodes within a node's OwnTree Interval are reachable and nodes within a node's Reachable Interval may be reachable. Significantly, nodes that are white are not reachable.

Figure 6A:
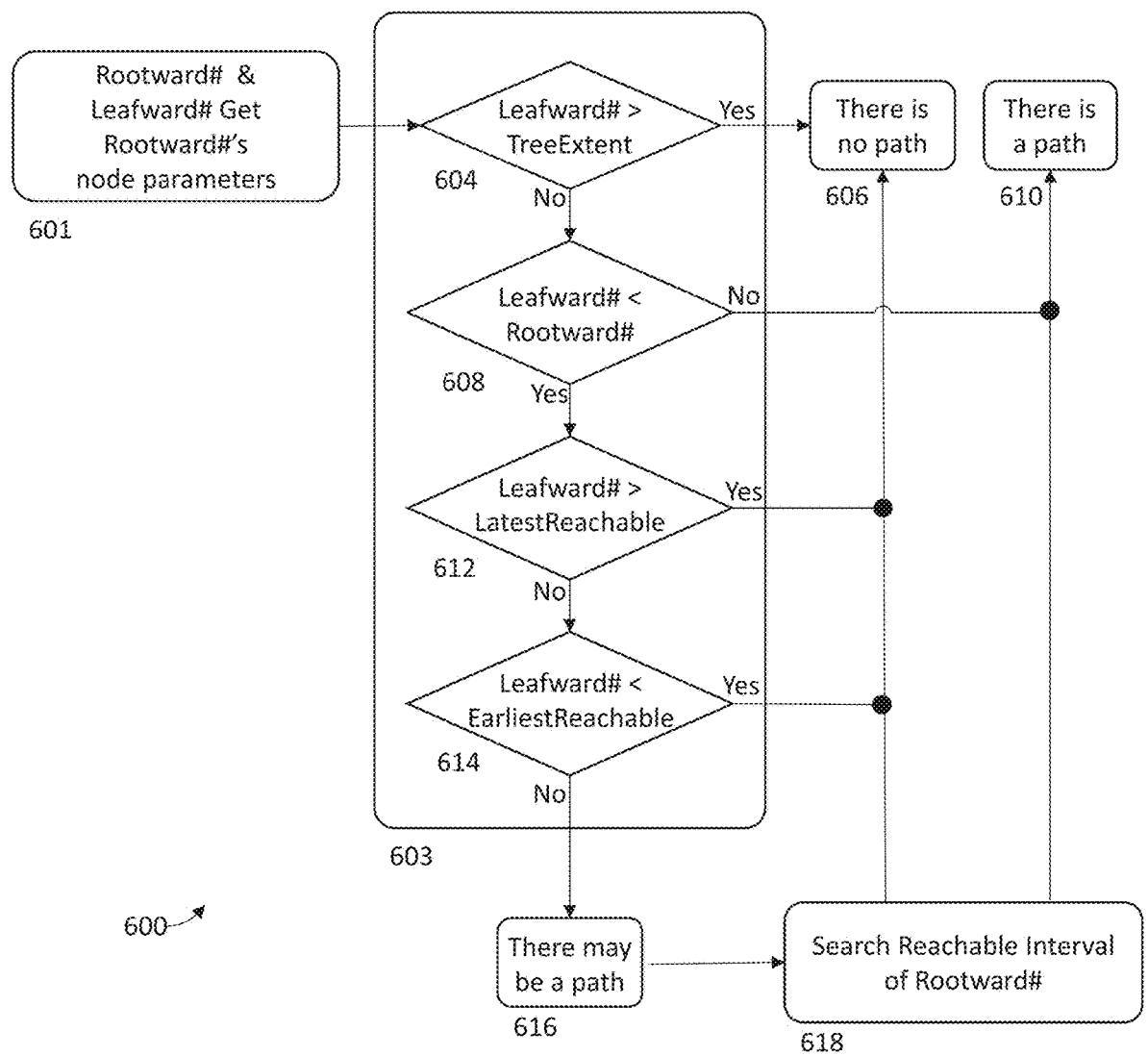
FIGS. 6A and 6B provide an exemplary method for determining if a node is reachable from another node.

In some embodiments, the node parameters stored for each node may help provide a faster search when determining if a node is reachable from another node. In some embodiments, the system may receive an input for a leaf-ward node and a root-ward node and determine, based on the graphbase and/or graph being searched, whether or not there is a path from the root-ward node to the leaf-ward node. For example, each node comprised within DAG 200 may represent a person. To further the example, suppose person 83 (e.g. the node with NodeValue 83) wants to determine if some people encountered in family research are ancestors or not, such as people represented by the nodes with NodeValues{72 70 66 63 52 55} hereby referred to as the leaf-ward set. The first step may be to convert (e.g. look up) the root-ward NodeNumber for person 83, which is NodeNumber 28, and the NodeNumbers for the leaf-ward set, which are {34 30 23 17 5 3}. The next step may be to apply exemplary method 600 shown in FIG. 6A for each root-ward, leaf-ward pair.

Method 600 is similar to observing a row in table 550, such as row 28. Initially, the node parameters for the root-ward node may be received (Step 601). With respect to the ancestry example, the Reachable Interval for Person 83 (e.g. NodeNumber 28) is [4-22] and the OwnTree Interval is [28-30]. Each of the leaf-ward nodes representing the people being considered as ancestors (NodeNumbers {34 30 23 17 5 3} in this example) can now be compared to these intervals (e.g. step 603). In some embodiments, each subsequent leaf-ward node is checked individually, such as via method 600, however in other embodiments multiple leaf-ward nodes can be checked at the same time. Similarly, a leaf-ward node may be checked against multiple root-ward nodes individually or checked against multiple root-ward nodes simultaneously. As discussed herein, each leaf-ward node may proceed to be checked (e.g. step 603) to determine whether or not there is a path between the respective leaf-ward node and the root-ward node.

With respect to the ancestry example, each possible ancestor (e.g. NodeNumbers {34 30 23 17 5 3}) may be checked. For ease of description, the example will have the leaf-ward nodes checked in descending order, however other orders may be used as well as having multiple nodes being checked at once, as described herein.

Turning to leaf-ward node 34, leaf-ward node 34 may be checked to see if its NodeNumber (e.g. NodeNumber 34) is larger than the TreeExtent of Node 28 (which is 30 in this example). Because 34 is larger than 30, the answer to Step 604 is YES and thus there is not a path from root-ward node 28 to leaf-ward node 34 (Step 606).

Turning to leaf-ward node 30, leaf-ward node 30 may be checked to see if its NodeNumber (e.g. NodeNumber 30) is larger than the TreeExtent of Node 28 (e.g. 30). Because 30 is not larger than 30 (e.g. NO in Step 604) the method proceeds to Step 608. Accordingly, leaf-ward Node 30 is then compared to the NodeNumber for Node 28 (NodeNumber 28). Because 30 is not less than 28, the answer to Step 608 is YES and thus there is a path between root-ward node 23 to leaf-ward node 30 (Step 610).

With respect to leaf-ward node 23, leaf-ward node 23 may be checked to see if its NodeNumber (e.g. NodeNumber 23) is larger than the TreeExtent of Node 28 (e.g. 30). Because 23 is not larger than 30 (e.g. NO in step 604) the method proceeds to step 608. Accordingly, leaf-ward Node 23 is then compared to the NodeNumber for Node 28 (NodeNumber 28). Because 23 is less than 28 (YES in Step 608) the method may proceed to step 612. In step 612, Node 23 is compared to the LatestReachable of Node 28 (e.g. 22). Because 23 is greater than 22, the answer to Step 612 is YES and thus there is not a path between root-ward node 23 and leaf-ward node 28 (Step 606).

Turning to leaf-ward node 17, leaf-ward node 17 may be checked to see if its NodeNumber (e.g. NodeNumber 17) is larger than the TreeExtent of Node 28 (e.g. 30). Because 17 is not larger than 30 (e.g. NO in step 604) the method proceeds to step 608. Accordingly, leaf-ward node 17 is then compared to the NodeNumber for Node 28 (NodeNumber 28). Because 17 is less than 28 (YES in Step 608) the method may proceed to step 612. In step 612, Node 17 is compared to the LatestReachable of Node 28 (e.g. 22). Because 17 is less than 22 (NO in Step 612), the method may proceed to Step 614. In step 614, leaf-ward node 17 is compared to the EarliestReachable of Node 28 (e.g. 4). Because 17 is not less than 4, the answer to Step 614 is NO and there may be a path between the leaf-ward node 17 and the root-ward node 23 (Step 616). The method may then proceed search through the reachable interval of leaf-ward node 17 (Step 618), which is described with respect to FIG. 6B.

As similarly described above with respect to leaf-ward node 17, leaf-ward node 5 may be checked to see if its NodeNumber (e.g. NodeNumber 5) is larger than the TreeExtent of Node 28 (e.g. 30). Because 5 is not larger than 30 (e.g. NO in step 604) the method proceeds to step 608. Accordingly, leaf-ward node 5 is then compared to the NodeNumber for Node 28 (NodeNumber 28). Because 5 is less than 28 (YES in Step 608) the method may proceed to step 612. In step 612, Node 5 is compared to the LatestReachable of Node 28 (e.g. 22). Because 5 is less than 22 (NO in Step 612), the method may proceed to Step 614. In step 614, Node 5 is compared to the EarliestReachable of Node 28 (e.g. 4). Because 5 is not less than 4, the answer to Step 614 is NO and there may be a path between the leaf-ward node 5 and the root-ward node 23 (Step 616). The method may then proceed search through the reachable interval of leaf-ward node 5 (Step 618), which is described with respect to FIG. 6B.

Turning to leaf-ward node 3, leaf-ward node 3 may be checked to see if its NodeNumber (e.g. NodeNumber 3) is larger than the TreeExtent of Node 28 (e.g. 30). Because 3 is not larger than 30 (e.g. NO in step 604) the method proceeds to step 608. Accordingly, leaf-ward node 3 is then compared to the NodeNumber for Node 28 (NodeNumber 28). Because 3 is less than 28 (YES in Step 608) the method may proceed to step 612. In step 612, Node 3 is compared to the LatestReachable of Node 28 (e.g. 22). Because 3 is less than 22 (NO in Step 612), the method may proceed to Step 614. In step 614, node 3 is compared to the EarliestReachable of Node 28 (e.g. 4). Because 3 is less than 4, the answer to Step 614 is YES and thus there is not a path between root-ward node 23 and leaf-ward node 4 (Step 606).

As described above, the resulting set of conclusions about whether or not there is a path between each leaf-ward node and the root-ward node 28 from Step 603 is {NO YES NO MAYBE MAYBE NO}. In other words: there is no path between node 34 and node 28; there is a path between node 30 and node 28; there is no path between node 23 and node 28; there may be a path between node 17 and node 28; there may be a path between node 5 and node 28; and there is no path between node 3 and node 28.

Figure 6B:
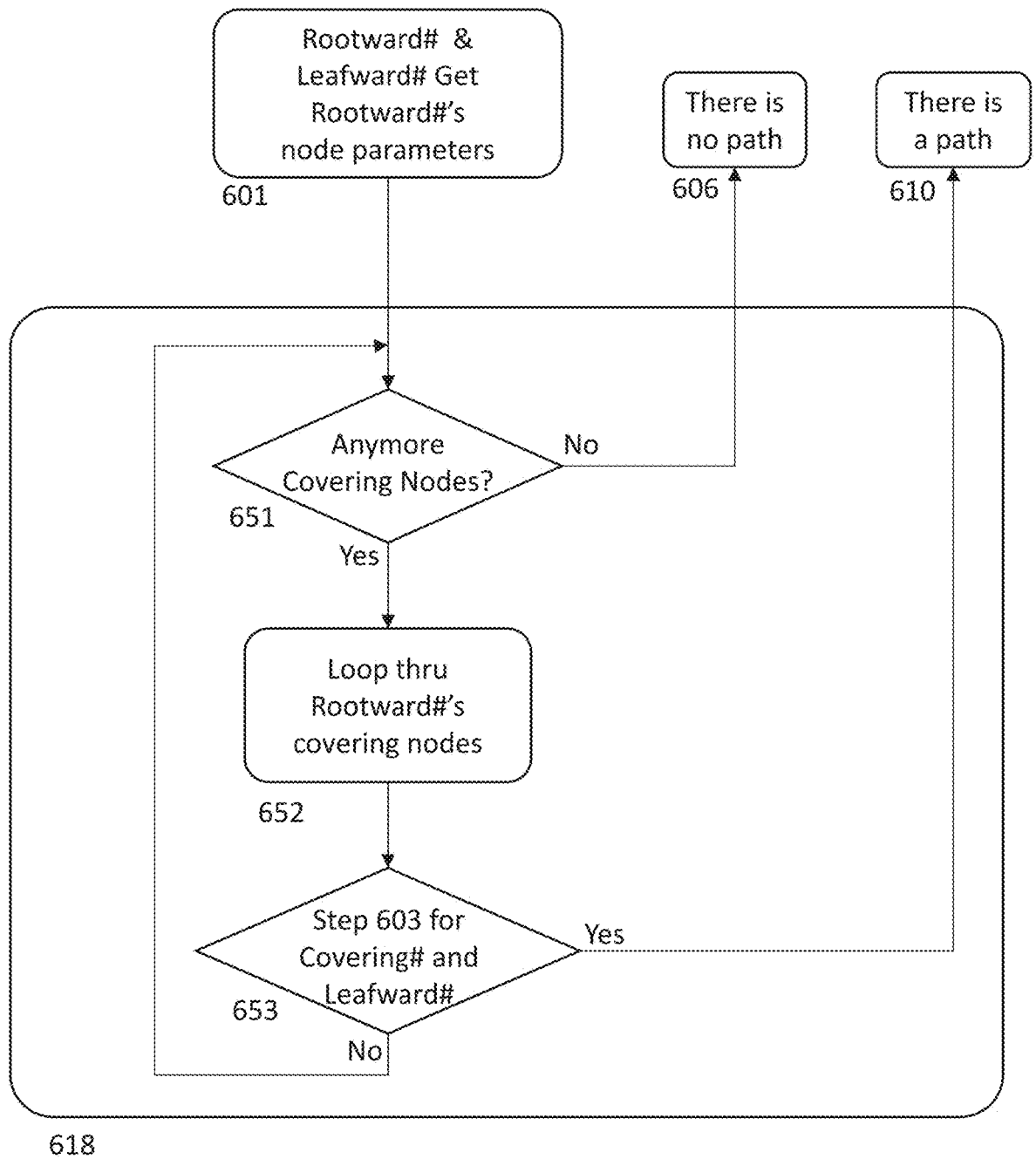

Advantageously, step 603 is a series of simple integer comparisons, which on some processors (e.g. computers, tablets, or the like) may use a single machine instruction, can definitely answer if there is a path between a root-ward node and a leaf-ward node and, if not then perform an additional search as shown in FIG. 6B (e.g. step 618). Thus, step 603 of method 600 may provide a definitive answer (e.g. there is a path or there is no path) for a portion or all of comparisons. As described herein, such a method can help increase the efficiency of determining whether or not there is a path between a root-ward node and a leaf-ward node.

The MAYBE's (e.g. Nodes which reached Step 616) can indicate that the leaf-ward node was in the root-ward node's reachable interval and, consequently, requires further search as described with respect to FIG. 6B. Checking in the order shown for method 600, such as with Step 603, may advantageously avoid searching the MAYBE's if there is a definitive answer, thus providing a more efficient and faster searching method when compared to prior art searching systems.

In some embodiments described wherein, using various node parameters may help prune the searching space which can advantageously reduce computation time when compared to prior art searching systems. In the ancestry example of the six cases illustrated, only two actually require a further Reachable Interval search (Step 618), leaf-ward nodes 17 and 5. Step 618 in FIG. 6B illustrates how searching using the node parameters can be accomplished. The search may comprise looping through each of the root-ward node's covering nodes (Step 652) and applying step 603 recursively, to each of the MAYBE node's covering nodes (Step 653). In some embodiments, this may comprise determining if the leaf-ward node falls within the Reachable Interval and/or TreeExtent of the covering nodes for the root-ward node of interest.

As shown, Step 618 may be performed until either a path is found from one of the covering nodes (e.g. YES in Step 653 or arrival at Step 610) or until no more covering nodes are available and a path was never found (e.g. NO in Step 651). In some embodiments, the covering nodes can be searched from the latest Reachable Interval to the earliest Reachable Interval so that the search is from larger NodeNumbers toward smaller NodeNumbers. Reachable Intervals may be compared based on which reachable interval has the smallest EarliestReachable, with the latest Reachable Interval having the larger EarliestReachable and the earliest Reachable Interval having the smallest EarliestReachable. In the case that the EarliestReachable values are the same, the Reachable Interval's may be compared based on which reachable interval has the smallest LatestReachable, with the latest Reachable Interval having the larger LatestReachable and the earliest Reachable Interval having the smallest LatestReachable. This may advantageously improve the search because the test for OwnTree Interval is definitive while that for the Reachable Interval is not. Alternatively, the covering nodes may be chosen in a different order, such as randomly, the order they were received, the order they were stored in, or the like.

If one of the covering nodes has a positive result (e.g. Step 610) then it is determined that there is a path between the original root-ward node and the leaf-ward node. Otherwise, if none of the covering nodes have a positive result, there is no path between the original root-ward node and the leaf-ward node (e.g. Step 606). It should be noted that Step 653 has two outputs, YES and NO, whereas Step 603 has three outputs, YES, NO, and MAYBE. This is because if Step 603 returns a MAYBE with the leaf-ward node and the covering node (e.g. arrives at step 616), step 618 will be performed again with the covering nodes to the covering node (e.g. recursively). Such a process may happen multiple times until a definitive answer is reached.

Continuing the ancestry example, there may be a path between root-ward node 28 and leaf-ward nodes 17 and 5. In each case, step 618 may be performed to determine whether or not Node 28 has paths to leaf-ward nodes 17 and 5. In both cases, it may be checked if the root-ward node has any additional covering nodes (Step 651) and if so, Step 552 loops through root-ward node 28's additional covering nodes {29 30} and checks if there is a path between the leaf-ward node and the covering node (Step 653). In some embodiments, step 653 recursively calls step 603 with each of the covering nodes, here {29 30}, as the next root-ward node.

Turning to leaf-ward node 17 may be checked against root-ward node 29 using the method described with respect to step 603. As similarly described above, leaf-ward node 17 may be checked to see if its NodeNumber (e.g. NodeNumber 17) is larger than the TreeExtent of node 29 (e.g. 29). Because 17 is not larger than 29 (e.g. NO in step 604) the method proceeds to step 608. Accordingly, leaf-ward node 17 is then compared to the NodeNumber for Node 29 (NodeNumber 29). Because 17 is less than 29 (YES in Step 608) the method may proceed to step 612. In step 612, Node 17 is compared to the LatestReachable of Node 29 (e.g. 22). Because 17 is less than 22 (YES in step 612), the method may proceed to Step 614. In step 614, leaf-ward node 17 is compared to the EarliestReachable of node 29 (e.g. 4). Because 17 is not less than 4, the answer to Step 614 is NO and there may be a path between the leaf-ward node 17 and the root-ward node 29 (Step 616). The method may then proceed to search through the reachable interval of root-ward node 29 (Step 618), which is described with respect to FIG. 6B.

As can be seen in FIG. 2D, node 22 is a covering node for node 29 (Steps 651& 652). Accordingly, leaf-ward node 17 may then be checked against node 22 (Step 653) using the method described with respect to step 603. As similarly described above, leaf-ward node 17 may be checked to see if its NodeNumber (e.g. NodeNumber 17) is larger than the TreeExtent of Node 22 (e.g. 22). Because 17 is not larger than 22 (e.g. NO in step 604) the method proceeds to step 608. Accordingly, leaf-ward node 17 is then compared to the NodeNumber for Node 22 (NodeNumber 22). Because 17 is less than 22 (YES in Step 608) the method may proceed to step 612. In step 612, leaf-ward node 17 is compared to the LatestReachable of Node 22 (e.g. 5). Because 17 is greater than 5, the answer to Step 612 is YES and thus there is not a path between root-ward node 22 and leaf-ward node 17 (e.g. NO in Step 653 for node 29). Accordingly, the method may proceed to step 651 to see if there are any more covering nodes. As shown in FIG. 2D, node 29 does not have any more covering nodes (e.g. NO in Step 651) so there is no path between leaf-ward node 17 and root-ward node 29 (e.g. NO in step 653 for node 28). Accordingly, the method may then proceed to step 651 to see if there are any more covering nodes for node 29 and, since there are none, the recursion backs out to root-ward node 28. Accordingly, the method may then proceed to step 651 to see if there are any more covering nodes for node 28. As shown in FIG. 2D and described herein, node 28 has an additional covering node, node 30 (YES in step 651)

Node 17 may then be checked against node 30 using the method described with respect to step 603. Leaf-ward node 17 may be checked to see if its NodeNumber (e.g. Node-Number 17) is larger than the TreeExtent of Node 30 (e.g. 30). Because 17 is not larger than 30 (e.g. NO in step 604) the method proceeds to step 608. Accordingly, leaf-ward node 17 is then compared to the NodeNumber for Node 29 (NodeNumber 29). Because 17 is less than 30 (YES in Step 608) the method may proceed to step 612. In step 612, Node 17 is compared to the LatestReachable of Node 30 (e.g. 30). Because 17 is less than 30 (NO in step 612), the method may proceed to Step 614. In step 614, node 17 is compared to the EarliestReachable of Node 30 (e.g. 30). Because 17 is less than 30, the answer to Step 614 is YES and thus there is not a path between root-ward node 30 and leaf-ward node 17 (e.g. NO in Step 653). Accordingly, the method may proceed to check if there are any more covering nodes for root-ward node 28. Since there are no more additional covering nodes, the answer to Step 651 is NO and there is not a path between leaf-ward node 17 and root-ward node 28.

A similar process may be performed with the other MAYBE in the ancestry example, node 5. Leaf-ward node 5 may be checked against root-ward node 29 using the method described with respect to step 603. As similarly described above, leaf-ward node 5 may be checked to see if its NodeNumber (e.g. NodeNumber 5) is larger than the Tree-Extent of Node 29 (e.g. 29). Because 5 is not larger than 29 (e.g. NO in step 604) the method proceeds to step 608. Accordingly, leaf-ward Node 5 is then compared to the NodeNumber for Node 29 (NodeNumber 29). Because 5 is less than 29 (YES in Step 608) the method may proceed to step 612. In step 612, Node 5 is compared to the LatestReachable of Node 29 (e.g. 22). Because 5 is less than 22 (YES in step 612), the method may proceed to Step 616, wherein Step 618 is performed using the covering nodes for Node 29, which is node 22.

Node 5 may then be checked against node 22 using the method described with respect to step 603. As similarly described above, leaf-ward node 5 may be checked to see if its NodeNumber (e.g. NodeNumber 5) is larger than the TreeExtent of Node 22 (e.g. 22). Because 5 is not larger than 22 (e.g. NO in step 604) the method proceeds to step 608. Accordingly, leaf-ward Node 5 is then compared to the NodeNumber for Node 22 (NodeNumber 22). Because 5 is less than 22 (YES in Step 608) the method may proceed to step 612. In step 612, Node 5 is compared to the LatestReachable of Node 22 (e.g. 5). Because 5 is less (or equal to) 5 (YES in step 612), the method may proceed to Step 616, wherein Step 618 is performed using the covering nodes for Node 22, which are nodes 4 and 5.

The method may then proceed to check if leaf-ward node 5 has a path to root-ward node 4. Leaf-ward node 5 may be checked to see if its NodeNumber (e.g. NodeNumber 5) is larger than the TreeExtent of Node 4 (e.g. 4). Because 5 is greater than 4, the answer to Step 604 is YES and there is no connection between leaf-ward node 5 and root-ward node 4. Then, the system may check to see if there are any other covering nodes (step 655) and then proceed to check leaf-ward node 5 with root-ward node 5 by running step 603 again.

Accordingly, leaf-ward node 5 may be checked to see if leaf-ward node 5 has a path to root-ward node 5. Leaf-ward node 5 may be checked to see if its NodeNumber (e.g. Node Number 5 is larger than the TreeExtent of Node 5 (e.g. 5). Because 5 is not larger than 5 (e.g. NO in step 604) the method proceeds to step 608. Accordingly, leaf-ward node 5 is then compared to the NodeNumber for root-ward node 5 (e.g. NodeNumber 5), because 5 is not less than 5, the answer to Step 608 is YES and there is a path between leaf-ward node 5 and root-ward node 5. Accordingly, the answer to Step 653 with respect to node 22 is YES, which results in the answer to step 653 with respect to node 29 being YES, which further results in the answer to step 653 with respect to node 28 being yes (e.g. Step 610).

As described herein, the ordering parameters can provide a strong pruning of the search space as shown in table 775 of FIG. 7. The 7 micro-seconds for "No Search Needed Time" are cases where the ordering parameters providing a definitive answer (e.g. a Yes or a No). The "Search Needed Time" are cases where a search was required, such as a search using methods 600 and 618. Furthermore, "n" refers to the number of nodes in the graph. Advantageously, the equations shown provide relatively small constants, 2.7 and 11, and further do not include any exponentials within the equation used to determine the amount of time needed. Because of this, the searching time required for larger searching spaces does not increase at an increasing rate and may complete searches quicker than prior art methods. For example, a bottom-up graph with 105 or 106 nodes (e.g. where log(n) is 5 or 6), may yield an approximate time of 22 to 33 micro-seconds. Importantly, the 22 to 33 micro-seconds are still constants regardless of the amount of edges connecting nodes. For example, with 10**5 nodes and $10^{60}$ potential edges to search, assuming a branching factor of 4 and path lengths of 100 between covering and covered nodes, the approximate search time may still be 22 to 33 seconds.

Storage of Graphbases in Memory

Figure 8A:
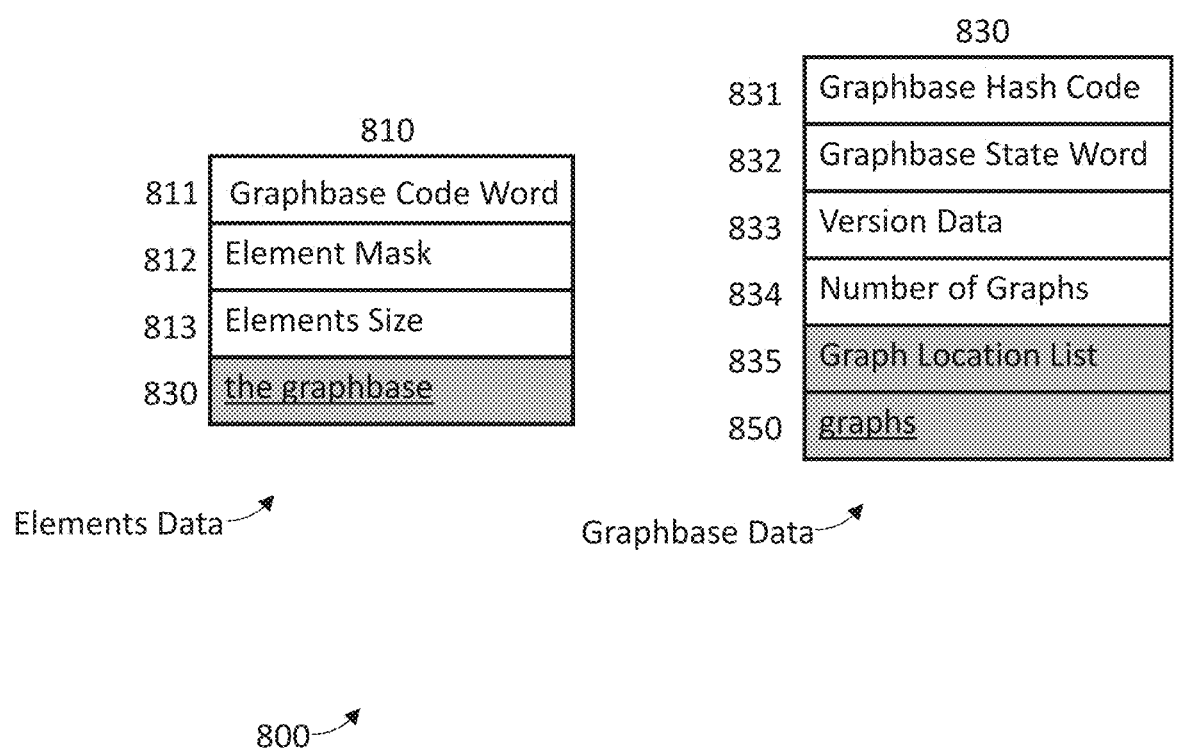

In some embodiments, the information regarding a graphbase (e.g. graphs, nodes, edges, node parameters, etc.) may be stored in memory, such as in a processor's registers, in a computer's main memory, in a computer system's files, somewhere on the internet, or the like. FIGS. 8A and 8B provide an exemplary storage system comprising various sub-arrays to store elements of a graphbase. With respect to FIGS. 8A and 8B, shaded entries indicate elements which are typically comprised of multiple elements and entry labels which are underlined indicate that details are described in a different sub-array. In some embodiments, each element may comprise a set amount of memory, such as a 4-byte or 8-byte computer word. However other amounts of memory may be used, such as less than 4-bytes, greater than 8-bytes, or between 4-bytes and 8-bytes. In some embodiments, each element may comprise the same amount of memory, however in alternative embodiments one or more elements may comprise a different amount of memory. In some embodiments, the size of the elements determines the sizes of the graphs and graphbase that can be stored. The exemplary embodiment uses 4-bytes which is sufficient to store a graph with 1 million nodes.

FIGS. 8A and 8B illustrate an exemplary elements array 800 which may comprise sub-arrays 810, 830, 850, and 870. Sub-array 810 may comprise elements regarding general information for the elements array 800. As shown, sub-array 810 can comprise elements 811-813. Such elements may provide information which can verify the elements array 800 (e.g. graphbase code word 811); provide information regarding an element mask (e.g. element mask 812); provide information regarding the size of the elements array 800 (e.g. elements size 813); and/or be continued or point to/reference sub-array 830.

The graphbase code word 811 may comprise a code word of a user's and/or external programs choosing so that, when read, the embodiment can verify that the data structure read is indeed an elements array that is stored. The element mask 812 may comprise a mask that an embodiment may apply to elements. The elements size 813 may comprise information regarding the size of the elements array. In some embodiments, elements size 813 may store information regarding the number of elements and/or amount memory (e.g. bytes) used to store Elements Array 800. Additionally or alternatively, elements size 813 may comprise data regarding which portions of memory are allocated for the elements array, such as pointing to the position within memory which comprises the last element within elements array 800.

Elements array 800 may comprise a graphbase sub-array 830. As illustrated, graphbase sub-array 830 may be positioned directly after sub-array 810, however other positions in memory may be used. In such examples, a pointer, object reference, etc. may be added to sub-array 810 which provides an indication to where sub-array 830 is stored in memory or the like. Graphbase sub-array 830 may comprise elements regarding information for the graphbase. As shown, graphbase sub-array 830 may comprise elements 831-835. Such elements may provide a password/encryption for the graphbase (e.g. graphbase hash code word 831); provide information regarding the graphbase state (e.g. graphbase state word 832); provide version information (e.g. version data 833); provide information regarding the amount of graphs comprised within the graphbase (e.g. number of graphs element 834); and provide information regarding the location of the graphs (e.g. graph location list element 835).

The graphbase hash code word 831 may allow a user and/or external application to protect the graphbase information stored in the elements array (e.g. elements array 800) such that a user and/or external application with the matching key/password may utilize the information comprised within the elements array. In such embodiments, the graphbase hash code word 831 may comprise a hash code. Additionally or alternately, various other encryption techniques may be used, such as passcodes (e.g. numerical, alphanumerical), biometric data, or the like.

The graphbase state word 832 is currently an unused place holder that could, in some other embodiments, be multiple elements. This allows the storage of data such as an application specific kind of graphbase or the user to have fields it can use as they (or their using software) see fit.

The version data 833 may comprise 4-bytes: a first byte for the major version number, a second byte comprising the minor version number, a third byte comprising the service version number, and a fourth byte comprising the elements data format version number.

The number of graphs element 834 may comprise information regarding the number of graphs comprised within the graphbase. Similarly, the graph location list element 835 may comprise information regarding where in memory each graph is stored. It can be indexed by the graph's GraphNumber which corresponds to the order that graph data is stored in elements array 800. For example, the graph location list element 835 may comprise a list of points in memory where each graph is stored. Additionally or alternatively, the graph location list element may comprise locations within the same elements array (e.g. elements array 800).

Elements array 800 may also comprise a graph sub-array 850 for each graph comprised within the graphbase. As illustrated in FIG. 8B, one or more graph sub-arrays 850 may be positioned directly after sub-array 830, however other positions in memory may be used as similarly discussed herein. Each graph sub-array 850 may comprise elements regarding information for the graph. As shown, each graph sub-array 850 may comprise elements 851-860.

Such elements may include a graph code word 851; a graph state word 852; a graph index 853; information regarding the graph size (e.g. graph size element 854); information regarding the number of nodes (e.g. element 855); information regarding the number of edges (e.g. element 856); information regarding the number of subgraphs (e.g. element 857); a list of node locations (e.g. node location list 858); a list of subgraph locations (e.g. subgraph location list 859); and a node 0 (e.g. element 860).

The graph code word 851 may comprise information making sure the data following is formatted as a graph. The graph state word 852 may comprise information regarding what type of graph each graph sub-array 850 is representing. For example, if the graph is ordered top-down (where roots are the tops and leaves the bottoms) or bottom-up (where roots are the bottoms and tops are the leaves), if the graph's edges are ordered as specified by the user (where all edges need to be searched), or by the embodiment (where only applicable edges are searched), or if the graph has been modified (where it can be re-ordered and re-rendered before being written) or not. In some embodiments, not all Graph State Word bits are used and can, in those embodiments, be made available to the user.

The graph index 853 stores the unique embodiment assigned index for the graph when the graph is created. It does not change for the lifetime of the graph, even if other graphs within the graphbase are deleted and/or added. This provides the user or application program a means of always obtaining the same graph within a graphbase throughout its lifetime. For example, a graph's graph number may be assigned each time a graph or graphbase containing multiple graphs is stored but can be looked up using the graph index. The order within the graph location list (e.g. graph location list 835) corresponds to current graph numbers. The graph index 853 may be used to search within the graph location list to locate the sub-array for the graph with the same graph index 853.

The graph size element 854 may comprise the number of elements needed to store the graph sub-array. In some embodiments, such as embodiments wherein the elements array is not partitioned within memory, graph size element 854 can indicate where the next graph starts in the elements array.

The number of nodes (e.g. element 855) may comprise the size of the node location list 858. Similarly, the number of sub-graphs element 857 may comprise the size of the sub-graph location list 859 wherein a sub-graph is a subset of the nodes that are not connected (no edges) to nodes in other subgraphs. Additionally, the number of edges element 856 may comprise information regarding the amount of edges comprised with the graph.

The node location list 858 may comprise information regarding where each node within the graph is stored in memory and the subgraph location list 859 may comprise information regarding where each subgraph of the graph is stored within memory. In some embodiments both the node location list 858 and subgraph location list 859 may comprise a list of locations in memory where each node and subgraph are stored, respectively. However other embodiments have been contemplated, like pointers to data structures or references to objects.

Element 860 may comprise information regarding a node 0. Node 0, as discussed herein, may comprise information regarding the root nodes and leaf nodes comprised within a graph. Element 860 representing the node 0 for the graph may be comprised, like other nodes, as a sub-array 870.

In some embodiments, a DAG may comprise two or more independent subgraphs where each subgraph has no edges to any other subgraphs; that is, a subgraph does not have any edges to nodes in other subgraphs. As an example of subgraphs, consider the Hawaiian Islands before they were "discovered." The subgraph for all the people on the islands and their ancestors, would be a separate subgraph because it would not have any connections to the subgraph(s) for the rest of the world's people and their ancestors.

Each graph array may also comprise a node sub-array 870 for each node comprised within the respective graph. In some embodiments, node 0 may have a node sub-array 870. As illustrated, one or more node sub-arrays 870 may be positioned directly after graph sub-array 850, however, other positions in memory may be used, as pointers to a node data structure or node object references. Each node sub-array 870 may comprise elements regarding information for the node. As shown in FIG. 8B, each node sub-array 870 may comprise elements 871-881. Each node sub-array 870 may comprise a node state word 871; various node parameters (e.g. NodeValue 872, NodeNumber 873, my graph's number 874 to provide a means to access the data about this node's graph, TreeExtent 877, EarliestReachable 878, and LatestReachable 879); Num Covering Nodes 875; Num Covered Nodes 876; a list of which nodes cover this node (e.g. covering list 880); and a list of which nodes are covered by this node (e.g. covered list 881).

The covered nodes list and covering nodes list for all nodes in the graph may comprise a doubly linked list representing each edge; that is, each edge's covering node is linked to its covered node and vice-a-versa, each edge's covered node is linked to its covering node.

The covered nodes List 881 can comprise all nodes where there is an edge from the node to a covered node. The covered nodes list can be ordered in the same order as the edges used to create it are encountered and processed as discussed herein. The first node in the list may correspond to the first edge to the node and the one where its node number is assigned.

In some embodiments, the covered nodes list 881 is comprised with the first node being the one where its node number is assigned. This allows stateless graph traversal algorithms to be comprised because, if a visit is from the covered node's list's first node, it is the first visit; otherwise it is not the first visit.

The covering nodes list 880 may be comprised of all nodes where there is an edge from the covered node to the covering node. The ordering of the covered nodes list may be comprised of earliest reachable interval to latest reachable one. In some embodiments this is done to help limit search so that the remaining covering nodes do not need to be searched.

Figure 9:
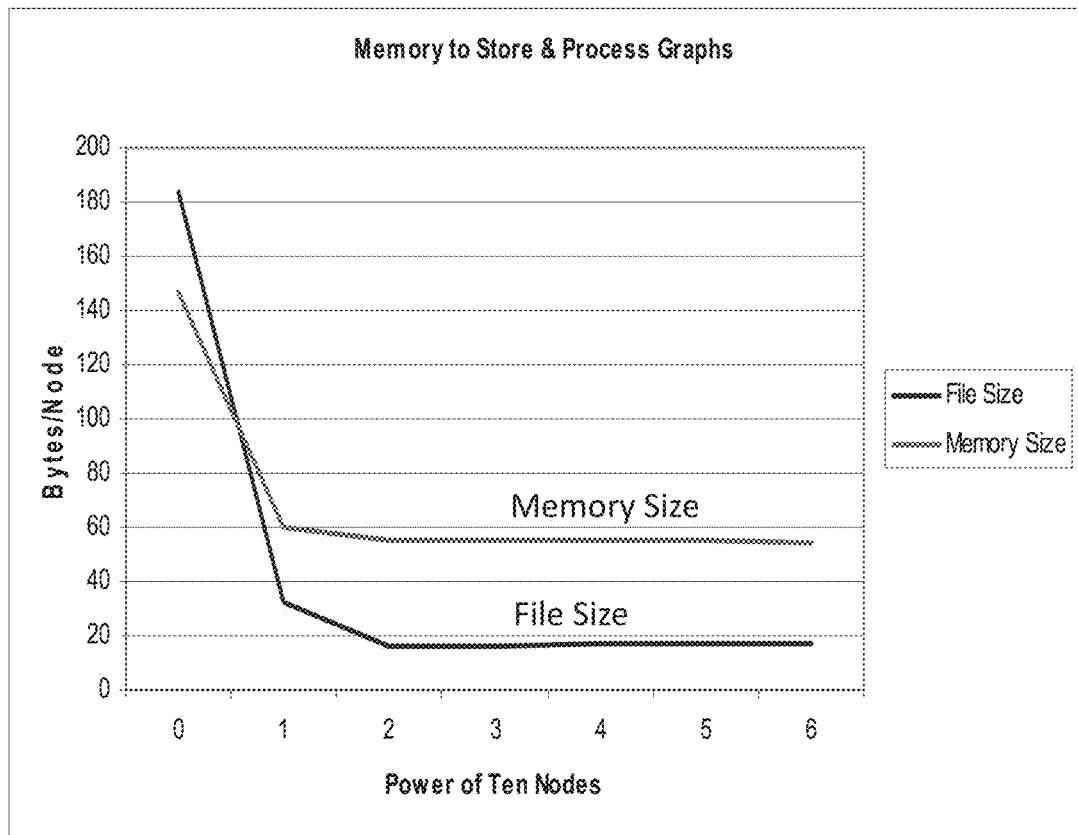
FIG. 9 provides an illustration of the memory needed to store graphbases of various sizes.

In some embodiments, elements array 800 is one large array encompassing the elements sub-array 810, graphbase sub-array 830, all the graph sub-arrays 850 and all node sub-arrays 860 and 870. Such an embodiment may advantageously reduce the amount of memory needed because separate individual data structures or objects typically require sizing and typing data to be stored with them. FIG. 9 shows that the memory needed for large graphs converges to about 56 bytes/node. This includes the overhead of the elements for sub-arrays 810, 830, and 850 which tend to dominate the size for small graphs.

The embodiments described herein can improve the efficiency compared to the prior art for at least a couple of reasons. First, fewer memory allocations may be used for the entire elements array. For example, previous designs require many allocations (and subsequent deallocations) for separate data structures or objects whereas the elements array, as described herein, may be stored using one memory allocation. Second, in a single large array access is typically relative to the start of a graph or node with the desired element being a constant number of elements away or a constant plus an offset away. In most computers this corresponds to just one or two machine instructions. For data structures or objects, their location in memory can be found (they may even have to be loaded first) and access to their contents may even involve subroutine, procedure, or method calls. And third, the node sub-arrays 870 can be in node number order which means that the order in the elements array matches the traversal ordering of the graph's nodes. This allows the locations of the node sub arrays in the elements array to be used during search which is much more efficient at times. In an exemplary test performed on an older desktop computer, the result was that the time to walk a graph converges to 140 nano seconds/node.

Ordering and Rendering Graphs

Graphbases can be stored in locations where they can be accessed by a user, such as on a local server, on a server connected to the internet, in a memory of a computer accessible to a user, or the like. In some embodiments, the graphbases may be stored indefinitely, such as for the lifetime of the memory storing them. Alternatively, graphbases may be stored temporarily, such as for a predetermined amount of time.

When a graphbase is created, the file which contains the graphbase may be opened for write and subsequently one or more graphs can be added and the graphbase can be updated and written back to the file. Over the life of the graphbase, there may be many edits of adding, deleting, or modifying graphs, nodes, and edges. Each time the graphbase is written back (e.g. updated), the graphbase data may be updated such as to represent the most current version of the graphbase.

Some embodiments may choose to implement graphbases for use by multiple concurrent readers and a signal concurrent writer. This can be accomplished by having the readers share a signal copy of the Elements Array. Such embodiment may further enforce that none of the readers are allowed to change the Elements Array and/or update the graphbase. Furthermore, some embodiments may enforce that there is only a single writer at a time such as to limit the forking of versions of a graphbase while updating. That single writer may get its own copy of the Elements Array in which graphs, nodes, and edges can be added, deleted, or modified as described below. When the single writer finishes writing the new version of the graphbase back to its file, the embodiment can allow any subsequent readers to get an updated copy of the Elements Array.

The following paragraphs provide an exemplary description on how a graphbase can be updated. In embodiments wherein the writer has its own copy of the Elements Array, the writer can use all the data Elements in it to update data as needed as long as it preserves enough data to create and write a new Elements Array for the updated graphbase.

Figure 10:
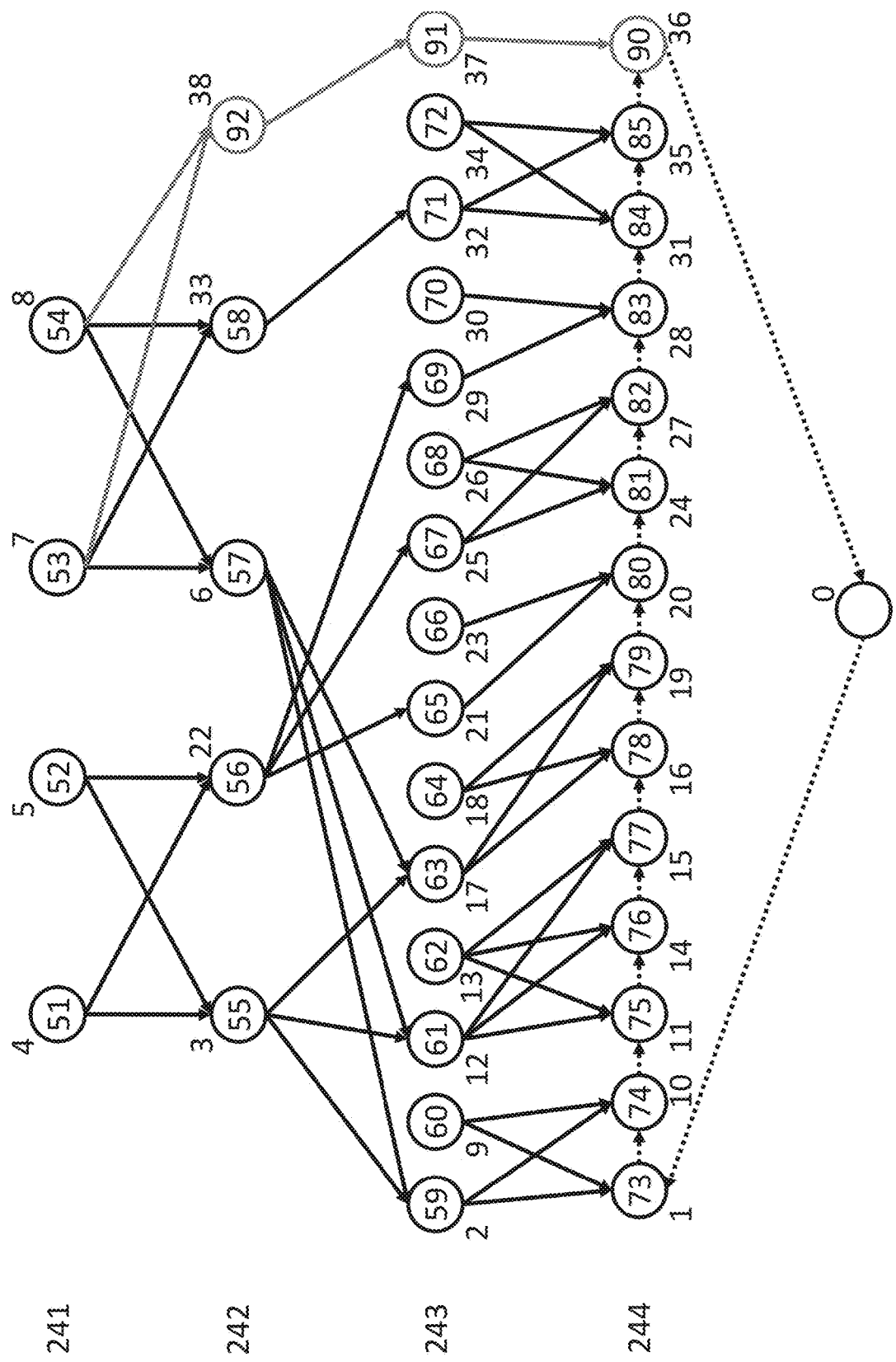
FIG. 10 illustrates an exemplary edit of adding nodes to the directed acyclic graph of FIG. 2D.

FIG. 10 illustrates an exemplary edit adding nodes with values 90, 91, and 92 and edges 90<91, 91<92, 92<53, and 92<54. Method 1100 shown in FIG. 11 describes an exemplary way of updating a graphbase. Step 1102 illustrates opening the file comprising the example ancestry graphbase file. Next, the method may proceed to determine whether or not the graphbase is open to being writeable (Step 1104). If the graphbase is not writeable (NO in Step 1104), the method may proceed to not allow editing the graphbase (Step 1105). In some examples, a user may be notified and/or provided reasoning why the graphbase is not writeable (e.g. the graphbase is currently being written to). If the graphbase is writeable (YES in Step 1104), the method may further proceed to receive various updates to the graphbase and/or provide an updated version of the graphbase (Step 1106). In some embodiments, the updates may be provided by a user (such as via a user interface) or an application. Once or as edits for the graphbase are received, the method my further proceed to use the modifiable version of the elements array to delete edges, nodes, and or even whole graphs and create extension data structure for any added nodes and edges. With respect to the added nodes and edges shown in FIG. 10, the result would be an extension data structure for each of nodes 90, 91, and 92 listing their edges and extension data structures for nodes 53 and 54 listing their new edges. In some embodiments, the received edits for the graphbase may already comprise the extension data structures (e.g. Step 1108) and thus may not be necessary which is indicated by the dashed ovoid. For example, a user and/or application may provide edits via extension data structures, or the like.

Walking a bottom-up ordered graph from the bottoms to the tops may comprise of starting from the roots and following each node's edges depth-first until no more nodes can be reached from the respective root and then moving on to the next root, following that root's edges, and repeating such a pattern for each of the remaining nodes. A walk of a graph from the tops to the bottoms may start at the leaves and walk toward the roots using a similar methodology. To avoid following edges that have been followed before, some graph walk algorithms have a way to determine if a node has been visited before and, if so, not follow its edge again.

For ease of reference, a first encounter may be defined as when an edge from a fromNode to another toNode has not been visited before and said edge may be defined as a prime path. As described herein, each node may have a list of covered nodes. Some embodiments can make sure that the prime path is the first node in this list of covered nodes. That way a graph walk algorithm can easily check if a node has been visited before by testing if the prime path leads back to the fromNode rather than leading back to some other node that is not on the prime path. Furthermore, this approach may not require any additional state data such as a visited bit. Consequently, the graph walk algorithm can be concurrently executed by many tasks and/or processors at the same time without fear of conflicting with each other. This is especially important when graphs are being constructed and saved for the first time and, consequently, node numbers not yet known.

Figure 12:
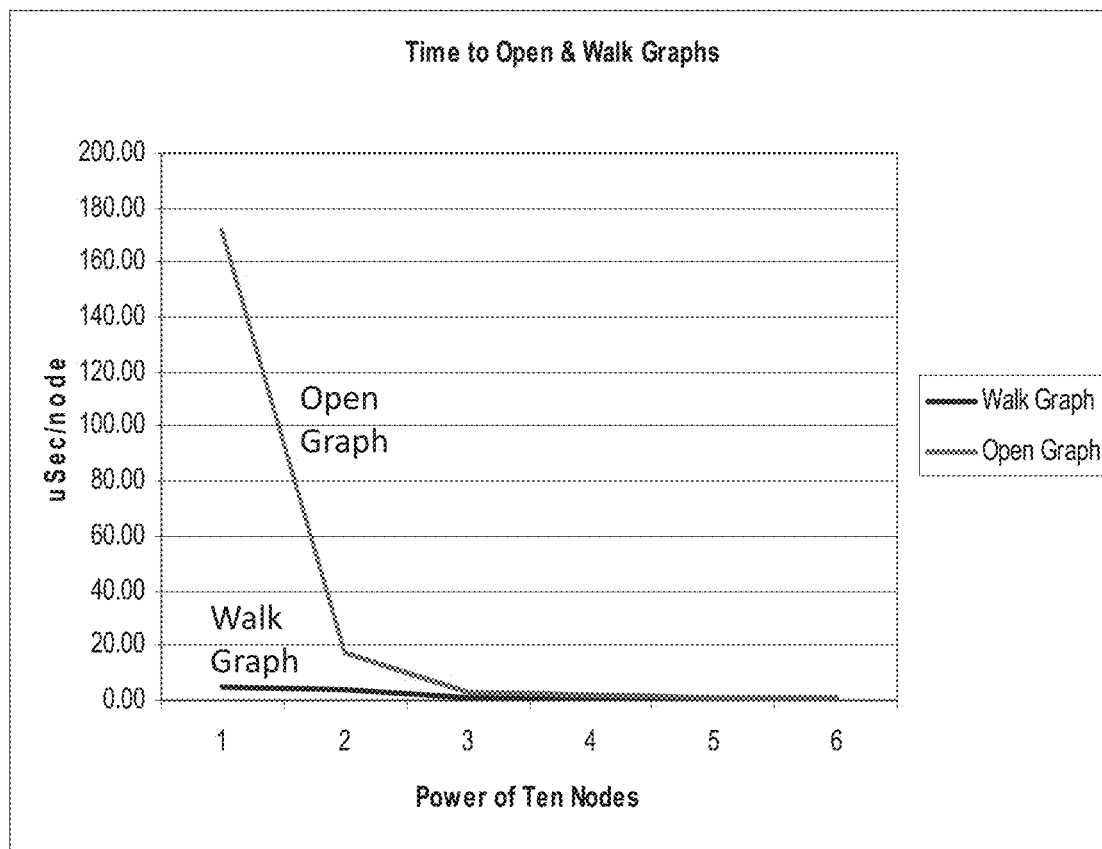
FIG. 12 provides an illustration of the amount of time needed to perform a graph walk for graphbases of various sizes.

Since several uses of graph walk algorithms are described below and they can be potentially advantageous to users/ application programs, some embodiments may choose to implement them using an interface specification defining common useful graph walk methods like firstEncounter, subsequentEncounter, returningFromTo, and afterLastBranch. For a particular graph walk, an implementation for the interface methods that it wants to have executed during the graph walk may be provided, such as via the application being used. The graph walk algorithm itself may then just walk the graph and call the provided implementations at appropriate points in the walk. FIG. 12 shows that the time to walk a graph converges for large graphs (e.g. graphs with 105 and 106 nodes) to about 140 nanoseconds/node with a simple desktop computer being used to perform the tests.

Method 1100 includes two graph walks. Step 1120 may comprise the first graph walk, wherein the nodes may be numbered from 1 to the number of nodes in the graph. Each time a node is visited for the first time, the firstEncounter graph walk method may assign the next larger node number until all nodes have been visited. This can establish a traversal ordering for the nodes. This ordering walk may determine the values of each node's ordering parameters, order the leaf-ward edges based on the ordering parameters, order the root-ward edges based on the visit order, determine the subgraphs, and determine the size of each node and of the graph comprising those nodes just walked. When all graphs have been walked, their sizes may be added up and used to determine the size of the entire graphbase. This can be used in Step 1130 to allocate the memory needed for an Elements Array to store the entire updated graphbase.

Step 1140 may comprise the second graph walk, wherein the method can render the updated graphbase in the new Elements Array. This can be done in the same traversal order as the graph walk of Step 1120 so that the nodes of each graph are located in the Elements Array in the same order. That way the location of nodes in the Elements Array can be used to improve performance because order comparisons can be done with locations instead of looking up corresponding node numbers and using those.

Figure 11:
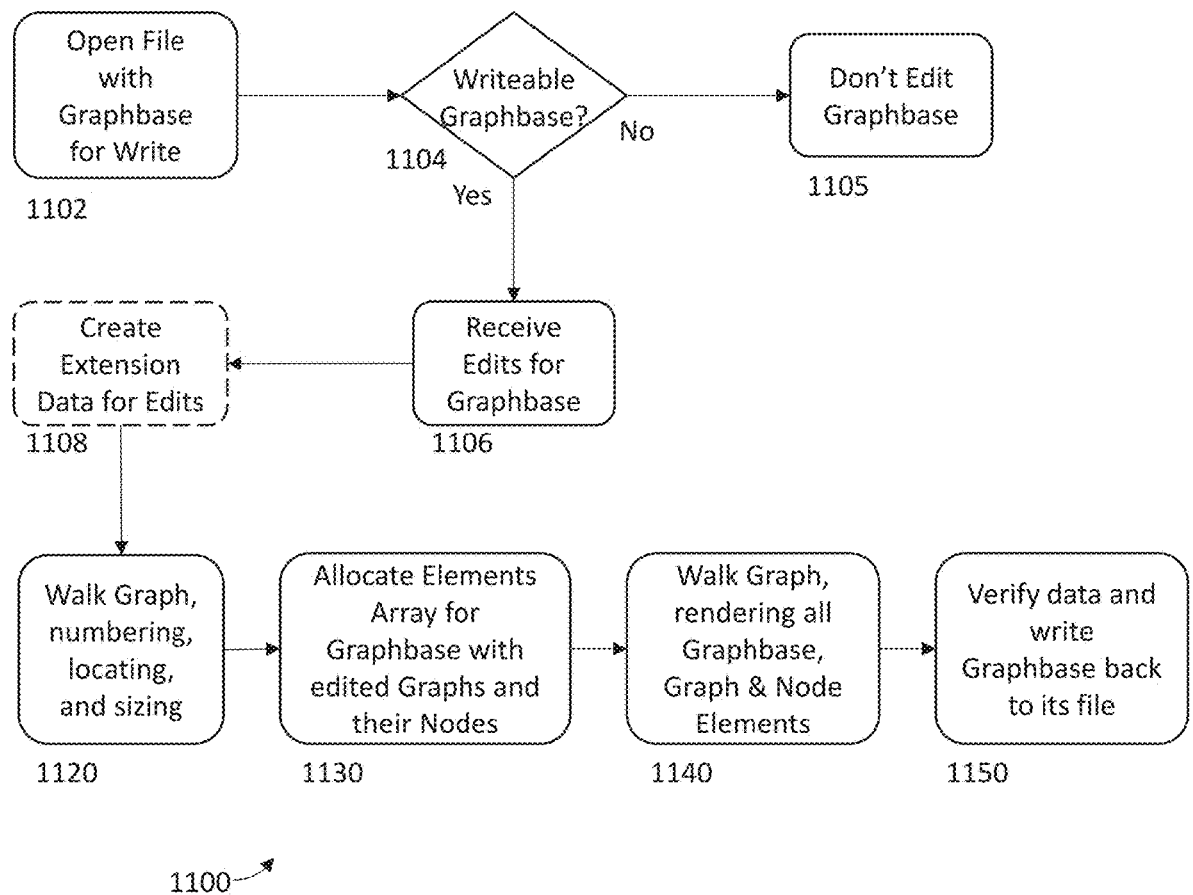
FIG. 11 provides an exemplary method for updating a graphbase.

Step 1150 of FIG. 11 includes data verification. This can be an important step because the graphbase's file is about to be overwritten with a new version and if that new version has any errors, it could make the graphbase unusable. In some embodiments, older versions of the graphbase may be stored as a backup, in case such a situation occurs. Typical verifications are that each node identifies its graph, that all edges have corresponding bi-directional links, etc. Then, if verification is successful, the new graphbase is written back to its file.

Meet and Join Functions for Graphs

In various embodiments, data stored in the Elements Array 800 may be used when various functions are performed, such as search (described above), meet, and join. Advantageously, the node parameters as described herein can be used to improve the efficiency of those functions by reducing the size of the search space using the OwnTree Interval and the Reachable Interval. In some embodiments, various relationships between two or more groups of nodes can be determined, such as whether a first node has a path to a second node as described herein, Join and Meet functions, or the like.

The Join and Meet functions can both take inputs of a graph and a StartingSet of node numbers in the same graph. In some embodiments, Join(Graph, StartingSet) returns a ResultSet of the NodeNumbers that are the minimal join of the StartingSet nodes in the specified graph. Minimal join implies that there is a cover path from all nodes in the StartingSet up to each minimal join node in the ResultSet and that they are minimal because none of the ResultSet nodes has a cover path up to any of the other ResultSet nodes.

Figure 13:
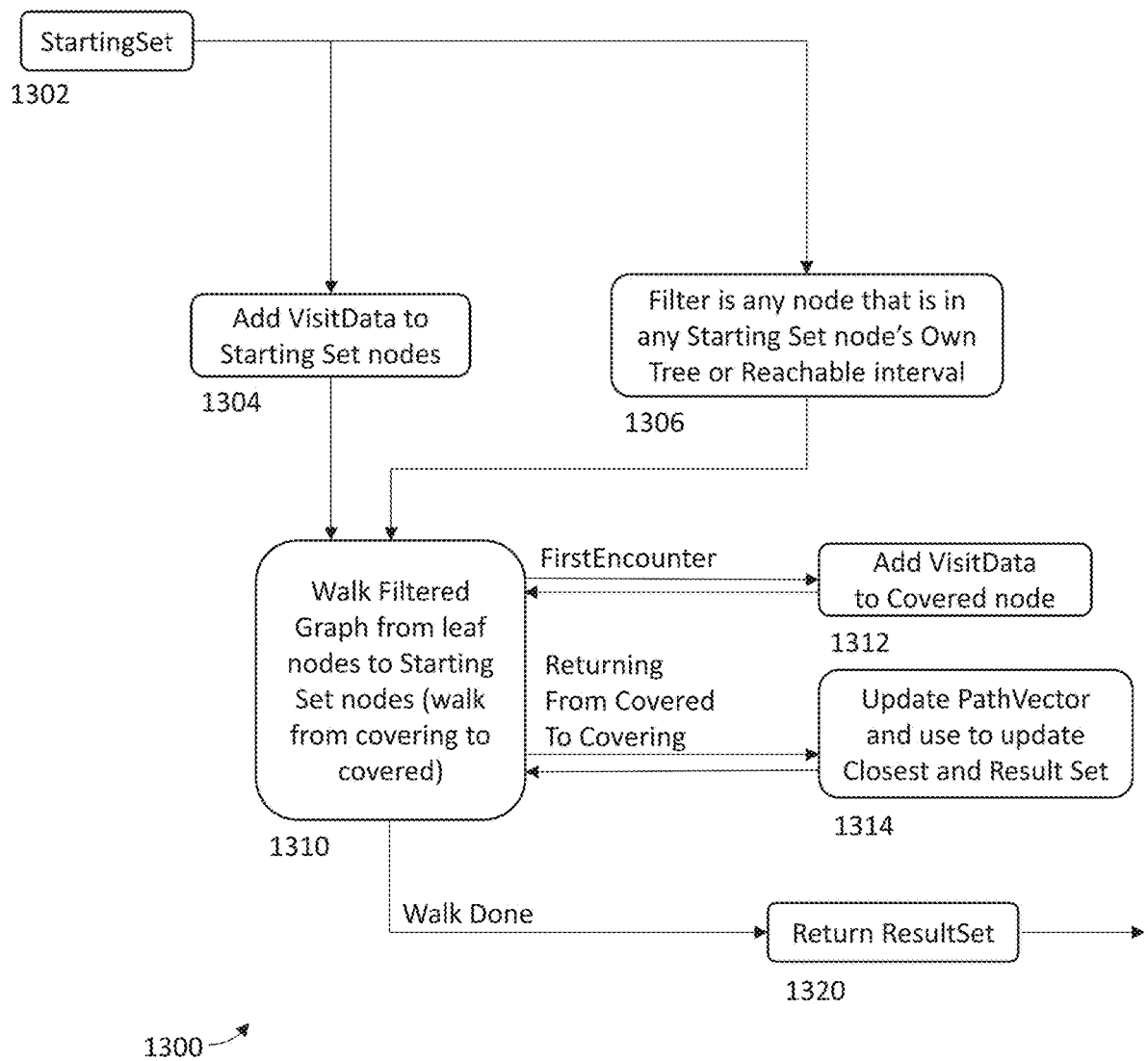
FIG. 13 provides an exemplary method of implementing a Join Function.

FIG. 13 illustrates an exemplary method 1300 showing how a Join Function may be implemented using the node parameters as discussed herein. Method 1300 illustrates a graph traversal/walking algorithm that can use a Join Interval Filter to guide which nodes to traverse/process and VisitData to record progress of the walk. VisitData may have a PathVector with a bit for each StartingSet (step 1302) node that, when set, indicates that the node has a path to that StartingSet node, a Closet bit to indicate that all PathVector nodes are set and that the node is currently considered to be a closest Join node and is in the ResultSet, and a Visited bit that is set when the walk has completed walking that node. In some embodiments, each portion of the VisitData may be marked (e.g. set to "1", TRUE, or the like) or unmarked (e.g. set to "0", FALSE, or the like) as discussed herein. In some examples, this may comprise either a "1" bit or a "0" bit, however other embodiments have been contemplated.

As shown in FIG. 13, the first step is to create VisitData for each StartingSet node (Step 1304). That VisitData is initialized with the bit corresponding to the StartingSet node in the PathVector set. This is so that, when encountered, the walk knows to propagate that PathVector bit (and any others set while walking past that StartingSet node) back when the walk returns from walking that StartingSet node as described below.

As shown in FIG. 13, the next step is to create the Join Interval Filter (Step 1306). The Join Interval Filter may comprise information regarding the node parameters of nodes within the search space to prune or filter the search space. Advantageously, the pruning or filtering of the searching space may provide more efficient and/or quicker searches than previously implemented designs. The Join Interval Filter can have an entry, indexed by NodeNumber, for each node of the graph. The Reachable Intervals and OwnTree Intervals of the StartingSet are used to determine whether each node in the filter is in one of those intervals. If so, there is potentially a path from the node to a StartingSet node. In that case, the filter entry for that node is set to "1", TRUE, indicating that there may be a path; otherwise the filter entry for that node is set to "0", FALSE, indicating that there is not a path from the node to any of the StartingSet nodes. As discussed herein, this filter can reduce computation time by not searching nodes that do not have a path to a StartingSet node. The Join Interval Filter can be based on a Boolean array created by a processor, an application, a user, or the like. In some embodiments, the Join Interval Filter may be indexed by NodeNumber and store information regarding if that node is covered by an interval (e.g. Reachable Interval and/or OwnTree Interval) of one or more starting nodes.

Method 1300 provides an example where the search is from leaves toward roots, however other searching methods may be used such as roots to leaves or the like. In method 1300 the filtered graph comprises all leaves in the filter and all rootward paths and nodes leading to any StartingSet node. Additionally or alternatively, it is possible that one or more StartingSet nodes have rootward paths to one or more other StartingSet nodes and the filtered graph includes these paths and nodes.

As shown, method 1300 includes the step of walking the filtered graph (Step 1310). This walk can start from the leaves that are in the filter and continues rootward, node-by-node from covering node to the next covered node. When a covered node that has not been visited before is encountered, VisitData for that node can be created (Step 1312). The walk of the filtered graph may then continue to the next covered node in the filter in a depth-first fashion. When the walk reaches a node that does not have any covered nodes in the filter, the covered node's VisitData Visited bit can be set and then the method may return to the covering node (Step 1314).

Method 1300's Step 1314 uses the covered node's PathVector to update the covering node's VisitData. If the covered node's PathVector is not all 1's, it can indicate that the covered node is not a Join node but may still have paths to one or more (but not all) of the StartingSet nodes. The covering node's PathVector may have some of its bits already set due to the walk having visited other of the covering node's covered nodes. The existing PathVector of the covering node is combined with the PathVector of the covered node to produce a new value for the covering node's PathVector. If the PathVectors are represented as bit vectors, this is accomplished with a simple binary OR operation. If the updated PathVector for the covering node is all 1's, it indicates that the covering node is a Join node. In that case, its VisitData's Closest bit can be set and the covering node is added to the ResultSet; and the walk then can continue with the covering node's next covered node in the filter because there could be a closer Meet.

If the covered node's PathVector is all 1's, it indicates that the covered node is a Join node. If the covering node's PathVector was already all 1's, it indicates that the covered node is a closer Join than the covering node. In that case the covering node's closest bit is cleared (set to 0) and it is removed from the ResultSet.

The walk of the filtered graph of Step 1310 may continue until all nodes in the filtered graph have been visited. In some embodiments, after all nodes in the filtered graph have been visited, the ResultSet can be returned (Step 1320). In some embodiments, returning the ResultSet may comprise providing the ResultSet to a user, an application, or the like.

Advantageously, using the Join Interval Filter can allow the Join Function to only visit nodes that, based on the filter, have and/or may have a path to a Starting Node. In some embodiments, VisitData can be initialized before the walk for each node in the Join Filter.

Additionally or alternatively, one or more other filters may be used in addition to or instead of the Join Interval Filter. For example, the Join Interval Filter described herein may be the OR of the StartingSet's Reachable Interval and OwnTree Interval. However, another filter comprising the AND of the StartingSet's Reachable Interval and OwnTree Interval may also be useable.

The exemplary method 1300 shown in FIG. 13 illustrates ways to use node parameters to improve the efficiency of a Join Function. One way is to filter the starting root nodes and the other is to filter the covering nodes during the graph walk. Other embodiments may use different node parameter techniques and filters in a Join Function.

Furthermore, embodiments may use the filtered graph walk as describe herein with respect to the Meet Function. For Meet Functions in a Bottom-Up graph, searching may start with the roots and proceed toward the StartingSet nodes and, instead of a specifically designed graph walking algorithm, may choose to extend the graph walk algorithm's list of methods to include a Meet Filter method. Other graphs, such as a Top-Down graph have also been contemplated. The Meet Filter method may return TRUE, "1", or the like if an edge being considered leads to a node that has some StartingSet node in either its Reachable Interval or OwnTree. In some embodiments, this may allow the walk for the Meet Function to be done by the graph walk step, such as by only following edges that lead toward StartingSet nodes.

Figure 14:
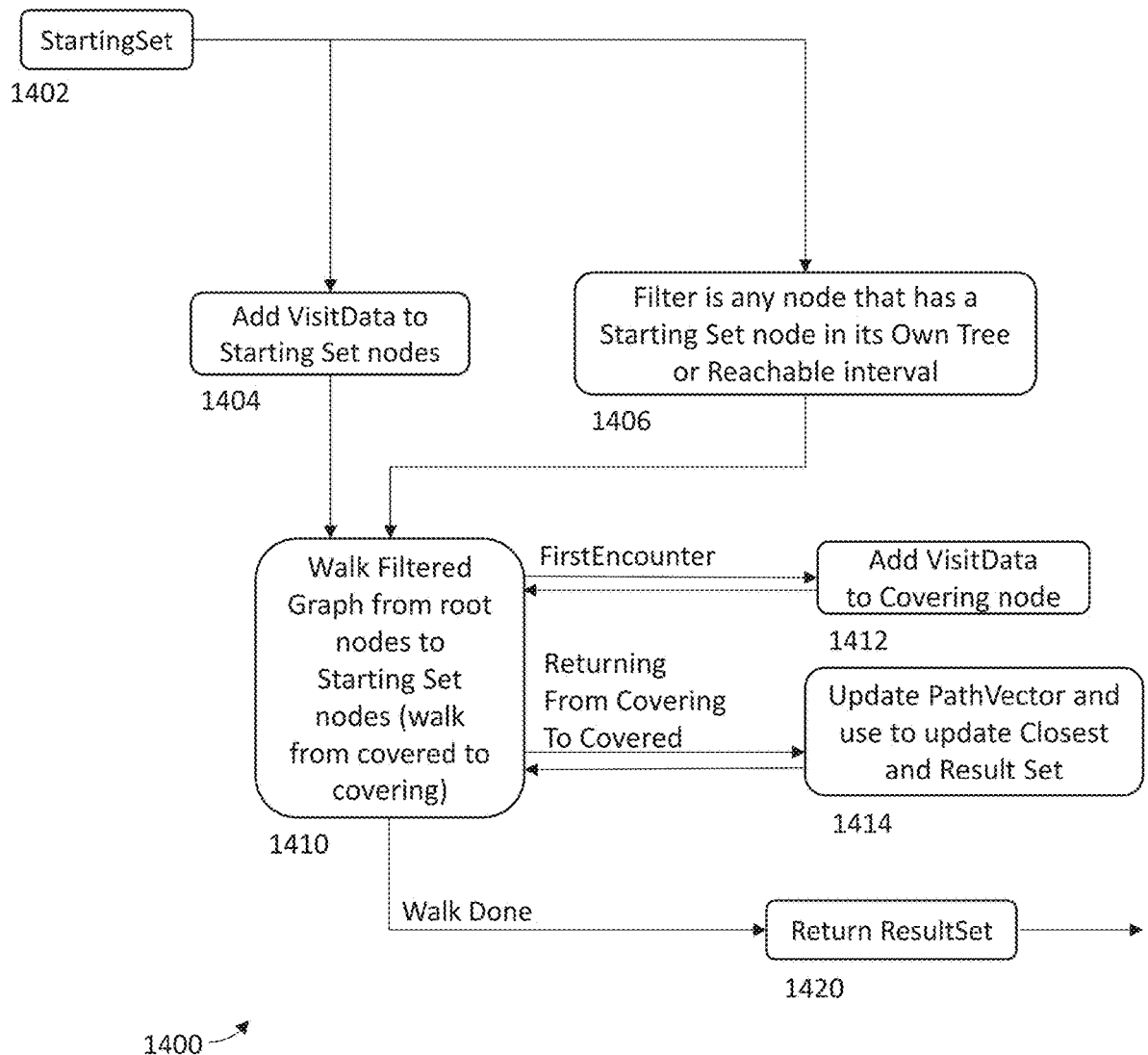
FIG. 14 provides an exemplary method of implementing a Meet Function.

FIG. 14 illustrates an exemplary method 1400 showing how a Meet Function may be implemented. The input for method 1400 may be the StartingSet (Step 1402) for some graph/graphbase and the end result may be the ResultSet (Step 1420).

The StartingSet can be used to initialize the VisitData for the nodes comprised within the StartingSet (Step 1404). VisitData may comprise a Closest node bit and a PathVector that has a bit for each StartingSet node. In some embodiments, if the bit is set (e.g. set to "1", TRUE, or the like), there is a path from the node to that StartingSet node.

In some embodiments, initializing the VisitData for the StartingSet nodes (Step 1404) may comprising setting the PathVector bit corresponding to that StartingSet. This is so that, when a StartingSet node is encountered, the walk may propagate those PathVector bits back when the walk returns from walking that StartingSet node as described below.

As shown in FIG. 14, the next step is to create a Meet Filter (Step 1406). The Meet Filter may comprise information regarding the node parameters of nodes within the search space to prune or filter the search space. Advantageously, the pruning or filtering of the search space may provide a more efficient and/or quicker search than previously implemented designs. The Meet Filter can be a bit vector, as described above with respect to the Join Interval Filter, an additional method as described next, or some other technique. In some embodiments, the Meet Filter method returns true if the node being tested has any of the StartingSet nodes in either its Reachable or OwnTree intervals. If so, there is potentially a path from the node to a StartingSet node. The Meet Filter method may be supplied as an additional parameter to the graph walk algorithm so that it only walks the filtered graph. The Meet Filter method can reduce computation time by not walking nodes that do not have a path to a StartingSet node.

The Meet Filter method can have an additional feature. By the definition of Meet, any ResultSet node will have all the StartingSet nodes in either its Reachable Interval or OwnTree Interval. Consequently, for a root to have a path to a ResultSet node, it can, or in some embodiments must, have all of the StartingSet nodes in either its Reachable Interval or its OwnTree Interval. Advantageously, adding this use of the node parameters to the Meet Filter method to filter the roots can allow the search to be strongly pruned using the node parameters to filter the root nodes from which to walk.

Walking the graph is illustrated by Step 1410. The walk may be from the filtered roots to StartingSet nodes by only walking to covering nodes whose Reachable Interval or OwnTree Interval includes at least one StartingSet node. This filter is used because, once leaf-ward of a ResultSet node, the path could be to just one StartingSet node and the ResultSet nodes are not known until the walk backs out as described herein.

The primary step in method 1400 is to walk the filtered graph (Step 1410). This walk starts from the filtered roots and continues leafward, node-by-node from covered node to the next covering node. When a covering node that has not been visited before is encountered, VisitData for that node can be created (Step 1412). The walk of the filtered graph may then continue to the next covering node in the filter in a depth-first leafward fashion. When the walk reaches a node that does not have any additional unvisited covering nodes in the filter, the covering node can then be returned (Step 1414).

Method 1400's Step 1414 uses the covering node's PathVector to update the covered node's VisitData. If the covering node's PathVector is not all 1's, it can indicate that the covering node is not a Join node but may still have paths to one or more (but not all) of the StartingSet nodes. The covered node's PathVector may have some of its bits already set due to the walk having visited other of the covered node's covering nodes. The existing PathVector of the covered node is combined with the PathVector of the covering node to produce a new value for the covered node's PathVector. If the PathVectors are represented as bit vectors, this is accomplished with a simple binary OR operation. If the updated PathVector for the covered node is all 1's, it can indicate that the covered node is a Join node. In that case, the covered node's VisitData Closest bit is set and the covered node can be added to the ResultSet; and the walk may continue with the covered node's next covering node in the filter because there could still be a closer Join.

If the covering node's PathVector is all 1's, it can indicate that the covering node is a Join node. If the covered node's PathVector was already all 1's, it can indicate that the covering node is a closer Join than the covered node. In that case the covered node's closest bit is cleared (set to 0) and it is removed from the ResultSet.

The walk of the filtered graph of Step 1410 may then continue until all nodes in the filtered graph have been visited. In some embodiments, after all nodes in the filtered graph have been visited, the ResultSet can be returned (Step 1320). In some embodiments, returning the ResultSet may comprise providing the ResultSet to a user, an application, or the like.

Advantageously, using the Meet Filter method can allow the Meet Function to only visit nodes that, based on the filter, have and/or may have a path to a Starting Node. In some embodiments, VisitData can be initialized before the walk for each node satisfying the Meet Filter method.

Additionally or alternatively, one or more other filters may be used in addition to or instead of the Meet Filter method. For example, the Meet Filter method described herein may use the OR of the StartingSet's Reachable Interval and OwnTree Interval. However, another filter comprising the AND of the StartingSet's Reachable Interval and OwnTree Interval may also be useable. Furthermore, embodiments may use the Join Function filtered graph walk as described herein with respect to the Join Function.

The exemplary method 1400 shown in FIG. 14 illustrates ways to use node parameters to improve the efficiency of a Meet Function. One way is to filter the starting root nodes and the other is to filter the covering nodes during the graph walk. Other embodiments may use different node parameter techniques and filters in a Meet Function.

Various methods for analyzing graphbases have been described herein. Additionally, various embodiments may be performed using various techniques, such as a non-transitory computer-readable medium and/or processor. For example, some embodiments may comprise a non-transitory computer-readable medium comprising executable instructions that, when executed by a programmable processor causes the programmable processor to perform various methods as described herein. Additionally or alternatively, a system comprising a memory and a processor may be used. In such examples, the memory may comprise data representing one or more DAGs as described herein and the processor may be configured to perform various methods as described herein.

Various embodiments have been described herein. Such examples are non-limiting, and do not define or limit the scope of the invention in any way.

The invention claimed is:

1. A method of determining a relationship between a plurality of nodes comprised within a graphbase, comprising:
   receiving the graphbase, the graphbase comprising:
      one or more directed acyclic graphs (DAGs), each of the one or more DAGs including:
         a main set of nodes, the main set of nodes comprising the plurality of nodes, each of the plurality of nodes representing a data point within the respective DAG and the plurality of nodes comprising a traversal order; and
         a plurality of directional edges connecting each of the plurality of nodes, wherein each of the plurality of directional edges represents covering-covered relationship between two nodes;

each of the plurality of nodes comprising node parameters, the node parameters of each respective node including:
  a NodeNumber representative of a location of the respective node within the respective DAG,
  a NodeValue representative of a unique identity of the respective node,
  a TreeExtent Node,
  a LatestReachable Node,
  an EarliestReachable Node, and
  when the plurality of nodes is represented in the traversal order:
    an interval of nodes between the NodeNumber and the TreeExtent Node defines an OwnTree Interval, wherein a sub-set of the plurality of nodes comprised within the OwnTree Interval are reachable from the respective node, wherein reachable is indicative of a path existing from one node to another node in the graphbase,
    an interval of nodes between the EarliestReachable Node and the LatestReachable Node defines a Reachable Interval, wherein a sub-set of the plurality of nodes comprised within the Reachable Interval may be reachable from the respective node, and
    all other nodes of the plurality of nodes not comprised within the OwnTree Interval and the Reachable Interval are not reachable from the respective node; and
receiving a selection of a first sub-set of nodes of the main set of nodes, wherein the first sub-set of nodes comprises a first node;
receiving a selection of a second sub-set of nodes of the main set of nodes, wherein the second sub-set of nodes comprises a second node;
determining a relationship between the first sub-set of nodes and the second sub-set of nodes based on at least the NodeNumber, the OwnTree Interval, and the Reachable Interval of at least one node comprised within the first sub-set of nodes, wherein determining the relationship between the first sub-set of nodes and the second sub-set of nodes comprises determining if the first node is connected to the second node, wherein determining if the first node is connected to the second node comprises:
  comparing the NodeNumber of the second node to the TreeExtent Node of the first node, wherein:
    if the NodeNumber of the second node is greater than the TreeExtent Node of the first node, determine that the first node is not connected to the second node; and
    if the NodeNumber of the second node is not greater than the TreeExtent Node of the first node:
  comparing the NodeNumber of the second node to the NodeNumber of the first node, wherein:
    if the NodeNumber of the second node is not less than the NodeNumber of the second node, determine that the first node is connected to the second node; and
    if the NodeNumber of the second node is less than the TreeExtent Node of the first node:
  comparing the NodeNumber of the second node to the LatestReachable Node of the first node, wherein:
    if the NodeNumber of the second node is greater than the LatestReachable Node of the first node, determine that the first node is not connected to the second node; and
    if the NodeNumber of the second node is not greater than the LatestReachable Node:
  comparing the NodeNumber of the second node to the EarliestReachable Node of the first node, wherein:
    if the NodeNumber of the second node is less than the EarliestReachable Node of the second node, determine that the first node is not connected to the second node; and
    if the NodeNumber of the second node is not less than the EarliestReachable Node of the second node, determine that the first node may be connected to the second node and a further search is needed.

2. The method of claim 1, wherein the node parameters further include:
  covered nodes, the covered nodes being representative of the NodeNumber's for nodes directly covered by the respective node; and
  covering nodes, the covering nodes being representative of the NodeNumber's for nodes directly covering the respective node.

3. The method of claim 2, wherein each of the one or more DAGs are bottom-up ordered DAGs, and each of the one or more DAGs further comprises:
  a set of leaf nodes, the set of leaf nodes being a sub-set of the main set of nodes for each of the one or more of the DAGs and the nodes comprised within the set of leaf nodes not having any covering nodes within the main set of nodes; and
  a set of root nodes, the set of root nodes being a sub-set of the main set of nodes for each of the one or more of the DAGs and the nodes comprised within the set of leaf nodes not having any covered nodes within the main set of nodes.

4. The method of claim 3, wherein each of the one or more of the DAGs further comprises a Node 0, Node 0 comprising node parameters, the node parameters including:
  covered nodes, the covered nodes being representative of NodeNumber's for nodes directly covered by the Node 0, the covered nodes comprising the set of leaf nodes; and
  covering nodes, the covering nodes being representative of NodeNumber's for nodes directly covering the Node 0, the covering nodes comprising the set of root nodes.

5. The method of claim 1, wherein the receiving the selection of the second sub-set of nodes comprises determining the second sub-set of nodes based on the first sub-set of nodes.

6. The method of claim 1, wherein the receiving the selection for the first sub-set of nodes comprises receiving a selection from at least one of: an application and a user interface.

7. The method of claim 1, wherein determining the relationship between the first sub-set of nodes and the second sub-set of nodes comprises:
  determining, for each node comprised within the first sub-set of nodes, the Reachable Interval and the OwnTree Interval;
  filtering the second sub-set of nodes based on whether each node comprised within the second sub-set of nodes is within the Reachable Interval and/or the OwnTree Interval of a node comprised within the first sub-set of nodes to generate a filtered second sub-set of nodes; and
  determining a relationship between the first sub-set of nodes and the filtered second sub-set of nodes.

8. The method of claim 7, wherein filtering the second sub-set of nodes comprises:
generating an Interval Filter, the Interval Filter comprising data for each node within the second sub-set of nodes and marking in an associated portion of the Interval Filter whether each node of the second sub-set of nodes falls within the Reachable Interval and/or the OwnTree Interval of a node within the first sub-set of nodes.

9. The method of claim 7, wherein determining the relationship comprises:
performing a Join Function and determining which nodes comprised within the second sub-set of nodes are minimal join nodes for the first sub-set of nodes; or
performing a Meet Function and determining which nodes comprised within the second sub-set of nodes are maximal meet nodes for the first sub-set of nodes.

10. The method of claim 1, wherein for each respective node:
when the Reachable Interval comprises the plurality of nodes, the nodes comprised within the Reachable Interval are distinct from the nodes comprised within the OwnTree Interval.

11. The method of claim 1, wherein each of the one or more DAGs are top-down ordered DAGs.

12. A non-transitory computer-readable medium comprising executable instructions that, when executed by a programmable processor causes the programmable processor to perform a method of determining the relationship between a plurality of nodes comprised within a graphbase, the graphbase comprising:
one or more directed acyclic graph (DAGs), each of the one or more DAGs including:
a main set of nodes, the main set of nodes comprising the plurality of nodes, each of the plurality of nodes representing a data point within the respective DAG and the plurality of nodes comprising a traversal order; and
a plurality of directional edges connecting each of the plurality of nodes, wherein each of the plurality of directional edges represents covering-covered relationship between two nodes;
each of the plurality of nodes comprising node parameters, the node parameters of each respective node including:
a NodeNumber representative of a location of the respective node within the respective DAG,
a NodeValue representative of a unique identity of the respective node,
a TreeExtent Node,
a LatestReachable Node,
an EarliestReachable Node, and
when the plurality of nodes is represented in the traversal order:
an interval of nodes between the NodeNumber and the TreeExtent Node defines an OwnTree Interval, wherein a sub-set of the plurality of nodes comprised within the OwnTree Interval are reachable from the respective node, wherein
reachable is indicative of a path existing from one node to another node in the graphbase,
an interval of nodes between the EarliestReachable Node and the LatestReachable Node defines a Reachable Interval, wherein a sub-set of the plurality of nodes comprised within the Reachable Interval may be reachable from the respective node, and
all other nodes of the plurality of nodes not comprised within the OwnTree Interval and the Reachable Interval are not reachable from the respective node; and
the method comprising:
receiving a selection of a first sub-set of nodes of the main set of nodes, wherein the first sub-set of nodes comprises a first node;
receiving a selection of a second sub-set of nodes of the main set of nodes, wherein the second sub-set of nodes comprises a second node;
determining a relationship between the first sub-set of nodes and the second sub-set of nodes based on at least the NodeNumber, the OwnTree Interval, and the Reachable Interval of at least one node comprised within the first sub-set of nodes, wherein determining the relationship between the first sub-set of nodes and the second sub-set of nodes comprises determining if the first node is connected to the second node, wherein determining if the first node is connected to the second node comprises:
comparing the NodeNumber of the second node to the TreeExtent Node of the first node, wherein:
if the NodeNumber of the second node is greater than the TreeExtent Node of the first node, determine that the first node is not connected to the second node; and
if the NodeNumber of the second node is not greater than the TreeExtent Node of the first node:
comparing the NodeNumber of the second node to the NodeNumber of the first node, wherein:
if the NodeNumber of the second node is not less than the NodeNumber of the second node, determine that the first node is connected to the second node; and
if the NodeNumber of the second node is less than the TreeExtent Node of the first node:
comparing the NodeNumber of the second node to the LatestReachable Node of the first node, wherein:
if the NodeNumber of the second node is greater than the LatestReachable Node of the first node, determine that the first node is not connected to the second node; and
if the NodeNumber of the second node is not greater than the LatestReachable Node:
comparing the NodeNumber of the second node to the EarliestReachable Node of the first node, wherein:
if the NodeNumber of the second node is less than the EarliestReachable Node of the second node, determine that the first node is not connected to the second node; and
if the NodeNumber of the second node is not less than the EarliestReachable Node of the second node, determine that the first node may be connected to the second node and a further search is needed.

13. A system for determining the relationship between a plurality of nodes comprised within a graphbase, the system comprising:
a memory, the memory comprising:
one or more directed acyclic graphs (DAGs), each of the one or more DAGs including:
a main set of nodes, the main set of nodes comprising the plurality of nodes, each of the plurality of nodes representing a data point within the respective DAG and the plurality of nodes comprising a traversal order;

a plurality of directional edges connecting each of the plurality of nodes, wherein each of the plurality of directional edges represents covering-covered relationship between two nodes;

each of the plurality of nodes comprising node parameters, the node parameters of each respective node including:
  a NodeNumber representative of a location of the respective node within the respective DAG,
  a NodeValue representative of a unique identity of the respective node,
  a TreeExtent Node,
  a LatestReachable Node,
  an EarliestReachable Node, and
  when the plurality of nodes is represented in the traversal order:
    an interval of nodes between the NodeNumber and the TreeExtent Node defines an OwnTree Interval, wherein a sub-set of the plurality of nodes comprised within the OwnTree Interval are reachable from the respective node, wherein reachable is indicative of a path existing from one node to another node in the graphbase,
    an interval of nodes between the EarliestReachable Node and the LatestReachable Node defines a Reachable Interval, wherein a sub-set of the plurality of nodes comprised within the Reachable Interval may be reachable from the respective node, and
    all other nodes of the plurality of nodes not comprised within the OwnTree Interval and the Reachable Interval are not reachable from the respective node; and a processor, the processor configured to:
  receive a selection of a first sub-set of nodes, wherein the first sub-set of nodes comprises a first node;
  receive a selection of a second sub-set of nodes, wherein the second sub-set of nodes comprises a second node; and
  determine a relationship between the first sub-set of nodes and the second sub-set of nodes based on at least the NodeNumber, the OwnTree Interval, and the Reachable Interval of at least one node comprised within the first sub-set of nodes, wherein the processor being configured to determine the relationship between the first sub-set of nodes and the second sub-set of nodes comprises the processor being configured to determine if the first node is connected to the second node, wherein the processor being configured to determine if the first node is connected to the second node comprises the processor being configured to:
    compare the NodeNumber of the second node to the TreeExtent Node of the first node, wherein:
      if the NodeNumber of the second node is greater than the TreeExtent Node of the first node, determine that the first node is not connected to the second node; and
      if the NodeNumber of the second node is not greater than the TreeExtent Node of the first node:
    compare the NodeNumber of the second node to the NodeNumber of the first node, wherein:
      if the NodeNumber of the second node is not less than the NodeNumber of the second node, determine that the first node is connected to the second node; and
      if the NodeNumber of the second node is less than the TreeExtent Node of the first node:
    compare the NodeNumber of the second node to the LatestReachable Node of the first node, wherein:
      if the NodeNumber of the second node is greater than the LatestReachable Node of the first node, determine that the first node is not connected to the second node; and
      if the NodeNumber of the second node is not greater than the LatestReachable Node:
    compare the NodeNumber of the second node to the EarliestReachable Node of the first node, wherein:
      if the NodeNumber of the second node is less than the EarliestReachable Node of the second node, determine that the first node is not connected to the second node; and
      if the NodeNumber of the second node is not less than the EarliestReachable Node of the second node, determine that the first node may be connected to the second node and a further search is needed.

14. The system of claim 13, wherein for each of the one or more DAGs, the nodes are stored in the memory in the traversal order and the processor is further configured to traversally order the nodes in the traversal order in the memory.

15. The system of claim 13, wherein each node comprised within the main set of nodes has a unique NodeNumber.

16. The system of claim 15, wherein the traversal order comprises a numerical system, such that:
  nodes comprising a higher NodeNumber value are higher in the traversal order; and
  nodes comprising a lower NodeNumber value are lower in the traversal order.

17. The system of claim 13, wherein determining the relationship between the first sub-set of nodes and the second sub-set of nodes comprises:
  determining, for each node comprised within the first sub-set of nodes, the Reachable Interval and the OwnTree Interval;
  filtering the second sub-set of nodes based on whether each node comprised within the second sub-set of nodes is within the Reachable Interval and/or the OwnTree Interval of a node comprised within the first sub-set of nodes to generate a filtered second sub-set of nodes;
  determining a relationship between the first sub-set of nodes and the filtered second sub-set of nodes; and
  performing at least one of:
    a Join Function and determining which nodes comprised within the second sub-set of nodes are minimal join nodes for the first sub-set of nodes; and
    a Meet Function and determining which nodes comprised within the second sub-set of nodes are maximal meet nodes for the first sub-set of nodes.

* * * * *